United States Patent [19]
Brandt et al.

[11] Patent Number: 6,108,673
[45] Date of Patent: *Aug. 22, 2000

[54] SYSTEM FOR CREATING A FORM FROM A TEMPLATE THAT INCLUDES REPLICATION BLOCK

[75] Inventors: Marcia Lynn Brandt; Joseph Vincent DiCecco, both of Rochester; Jason Robert Hansen, Chatfield; Timothy Jude O'Keefe, Rochester; Diane Elaine Olson, Rochester; Devon Daniel Snyder, Rochester, all of Minn.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,156

[22] Filed: Feb. 25, 1997

[51] Int. Cl.$^7$ ..................................................... G06F 17/21
[52] U.S. Cl. ........................... 707/505; 707/513; 707/506
[58] Field of Search ..................... 707/501, 505, 707/506, 513, 514, 517, 520, 522, 523, 104; 345/333, 334, 339, 347

[56] References Cited

U.S. PATENT DOCUMENTS

| | | | |
|---|---|---|---|
| 5,444,841 | 8/1995 | Glaser et al. | 707/506 |
| 5,461,710 | 10/1995 | Bloomfield et al. | 345/339 |
| 5,704,029 | 12/1997 | Wright, Jr. | 707/505 |

OTHER PUBLICATIONS

Bryan, *SGML and HTML Explained,* Addison–Wesley Publishers Limited, 1997, pp. 209–220.

Lemay, *Teach Yourself Web Publishing with HTML in a Week,* SAMS Publishing, 1995, pp. 296–324.

*Primary Examiner*—Stephen S. Hong
*Attorney, Agent, or Firm*—Owen J. Gamon

[57] ABSTRACT

An enhanced document browsing method and apparatus for creating a form from a template that includes replication blocks, that replicates at least one field in at least one replication block characterized by a block name to generate at least first and second replicated fields; modifies the block name to generate a first field name; modifies the block name to generate a second field name; associates the field names with respective ones of the first and second replicated fields; counts the number of replications; and transmits the number of replications to at least one client computer.

5 Claims, 28 Drawing Sheets

SYSTEM FOR CREATING A FORM FROM A TEMPLATE THAT INCLUDES REPLICATION BLOCK

FIELD OF THE INVENTION

This invention relates to the data processing field. More particularly, this invention relates to a system for communicating between a client and transient server programs.

BACKGROUND

In the early days of computers, processors and memory were very expensive to manufacture. Fortunately, the demands that one individual user could put on a processor and memory were small because the user interface was simple, even rudimentary; it consisted of a command line on a display terminal. To accommodate these limitations, computer designers of the day utilized a time-sharing, transaction-based model for computers where multiple users, each at a display terminal, would share one centrally-located processor and memory.

Thus, the centrally located processor (called a "host" or a "server") had multiple display terminals attached to it. The terminals typically contained little more than a display screen, a keyboard, and only enough memory and control circuitry necessary to display information at the terminal and send a screen's worth of data to the host processor in the form of a transaction. Today, we call these terminals "dumb terminals" because they lack a sophisticated processor and memory. The user would typically type one screen's worth of data at the terminal and then send it to the host by hitting an "enter" or a "transmit" key. This data would request the host to perform a transaction. The host would start a transient program to perform the transaction; when the transaction completed, the host would send data back to the terminal and the transient program would end. The host would then forget about the user until the next transaction. If the user submitted multiple transactions to the host, the host transient program did not know that these transactions were related. Likewise, the host did not know when the user was done issuing transactions. Thus, each transient program was self-contained and did not save information from one transient program to the next. This model worked well because the demands of one transaction from one user were very small compared to the processing power of the host, so while the processor was waiting for the user to type information on the screen and send a transaction, the processor would service transactions from other users. Thus, we call this is a time-sharing, transaction-based model.

With the advent of graphical user interfaces—where the user interacts with the computer via images, symbols and graphics—the demands on the central processor increased, so that it could no longer service the needs of a multitude of users, at a multitude of display terminals. Fortunately, the price of processors and memory decreased dramatically, so that users could afford to put a full-fledged computer complete with a sophisticated processor and memory on their desk. But, even with their new-found, desk-top autonomy and processing power, users still want to be connected to a centrally located computer, so that they can share information with friends, co-workers, customers, and suppliers, all scattered around the globe.

One such way to share information is the Internet, which is an example of an interconnected network of computers containing clients and servers. A way to share information on the Internet is via browsing. When a user at a client computer wishes to browse information at a server computer, the user gives a browser at the client an address of the desired document at the server. A document is a file of control-codes and information, which the control-codes describe. The browser at the client transmits this address to the server. The server then transmits the specified document to the client browser, which presents pages of information in the document to the user. A page is the information, as formatted by the browser interpreting the control-codes, that the browser presents to the user. This presentation may occur, for example, visually via the browser window on a display screen or aurally via speakers.

Although most people only first heard of the Internet in the early 1990's, it was actually developed in the 1960's, so it is built on the old, transaction-based computer model. But, today's users don't want to go back to the old model; they don't want to give up their sophisticated graphical user interface and the immediacy of the processing power on their desktop. The following are examples of problems with the transaction-based model.

First, the user does not get immediate feedback about the validity of the data the user enters on the screen. Instead, the user must wait for the client to send the transaction to the server, the server to valididate the data, and the server to send back a message, possibly containing a validity error, to the client.

Second, the user does not get immediate feedback on the actions the user has selected; if the user selects a control button, the user-interface does not indicate that the control button has been selected. This can be a significant usability problem, especially as the number of options on the screen becomes large and the time for the server to respond becomes lengthy.

Third, when the user need help information, the server sends it to the client as a new window, that is the same size as the original window and is overlayed directly on top of the original window. Thus, once the client displays the help window, the user can no longer see the original window, which contains the information about which the user needs the help.

Finally, transactions are not linked togethor. The user may request one piece of information from the server in a first transaction in order to re-enter the data in a request for a second transaction from the user.

For the foregoing reasons, there is a need for a system for communicating between a client and transient server programs.

SUMMARY OF THE INVENTION

It is an object of the present invention to enhance user access to information.

These and other objects are achieved by an enhanced document browsing method and apparatus for creating a form from a template that includes replication blocks, that replicates at least one field in at least one replication block characterized by a block name to generate at least first and second replicated fields; modifies the block name to generate a first field name; modifies the block name to generate a second field name; associates the field names with respective ones of the first and second replicated fields; counts the number of replications; and transmits the number of replications to at least one client computer.

DESCRIPTION OF THE PREFERRED EMBODIMENT

Technology Overview

Figure 1A:
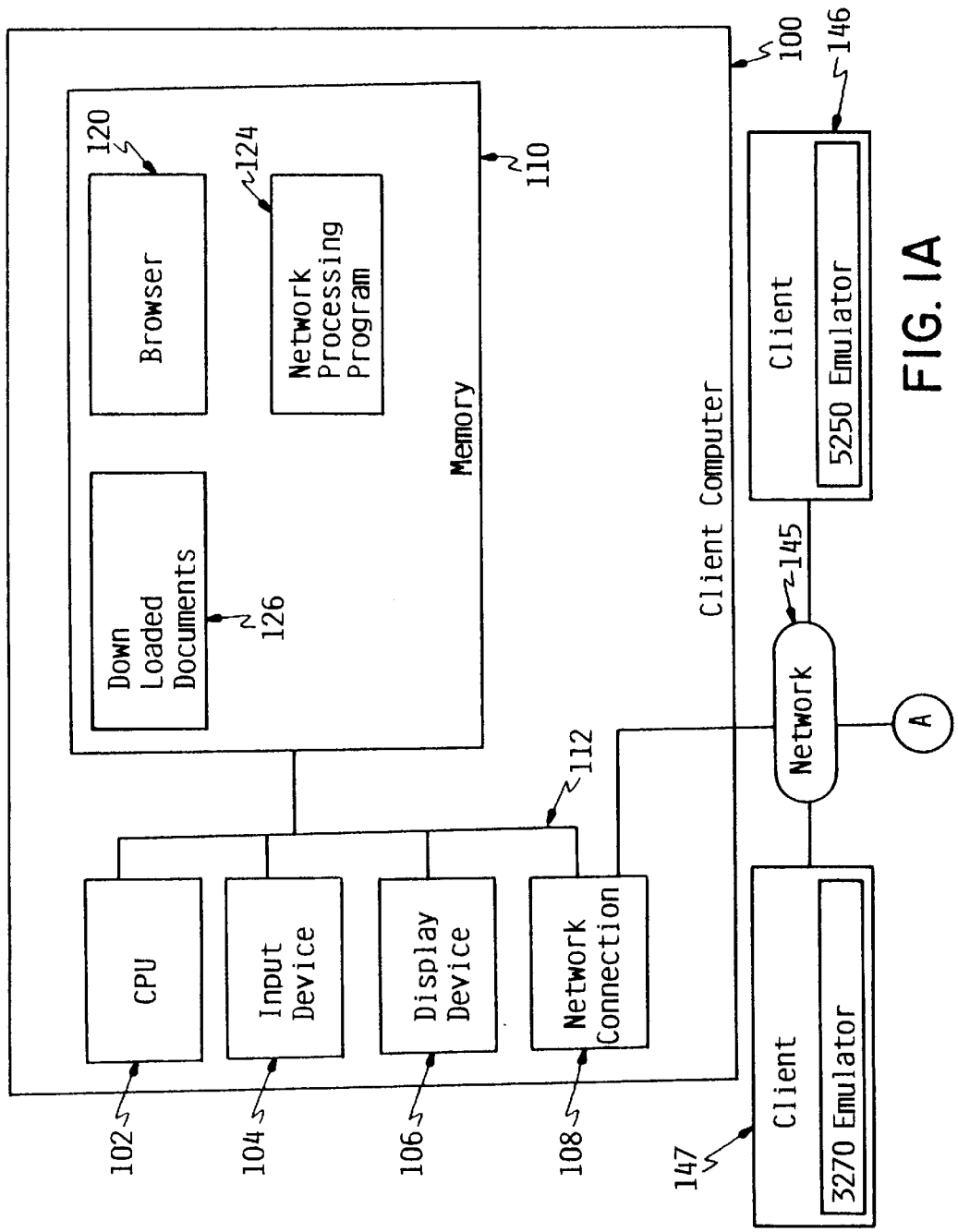
FIG. 1 is a block diagram that shows a client computer attached to a server computer via a network, according to the preferred embodiment.

The Internet is an example of a interconnected network of computers. A browser is a utility at the client that looks for and browses documents at the server. Examples of browsers are IBM's Web Explorer, Netscape Navigator, and NCSA (National Center for Supercomputing Applications) Mosaic.

A document is a file of control-codes—e.g. HyperText Markup Language codes (HTML)—and information, which the control-codes describe. HTML documents are purely textual and are instructions to the browser as to what to display or play back, as well as attributes (such as size or location on the page) to apply to what is displayed or played back. A developer of an HTML document may directly hand generate the HTML text or may use one of many tools to assist in this generation. The developer may also develop, search for, or buy multimedia objects (e.g., digitized graphic, sound files, or video files) to specify in the HTML text so as to cause their display or play back by the browser upon parsing the HTML. A page is the information, as formatted by the browser interpreting the control-codes, that the browser presents to the user. This presentation may occur, for example, visually via the browser window on a display screen or aurally via speakers.

In order to browse a document at a server, the user enters a Uniform Resource Locator (URL), which is an address of the desired document at the server, via the browser at the client computer. The browser at the client computer uses this URL to communicate with the server computer. The server transmits the document specified by the URL to the client browser for presentation to the user. The retrieved document may itself contain further embedded URLs linking to multimedia objects (such as text, bitmaps, sound files, or video files), so the client browser parses the retrieved document and downloads the linked multimedia objects for presentation via display or playback.

A way to send data from the client to the server and request the server to perform operations is to use a document that contains a construct that in HTML is called a "form". The word "form" denotes this concept because of the analogy to other, familiar situations. For example, when you want to submit data to your insurance company, you enter your data on the insurance company's form and mail it to them. Analogously, when a user at a client wants to submit data to a server, the user fills out an electronic HTML form. Thus a form, when interpreted by the browser, allows the user at the client to request operations of the server and submit data to the server.

A form may contain a "button" object that the user may use to control the document being browsed. The word "button" denotes this concept because of the analogy to other, familiar situations. For example, when you want to control your radio, you push a button to change stations. Analogously, when the user at a client wants to control a document being browsed, the user can electronically "push", click on, or otherwise select a button. There are a wide variety of form objects, generically called "control-objects", that a user might employ to control a document, including: a push-button for selecting an action, a radio button for making one selection among a group of options, a text-box or an input field for entering a line of text, and a check-box for selecting or deselecting a single, independent option.

A form is a perceptible, structured formatted entity displayed by a graphical user interface. Such a form contains field in which a user may type data. In this regard, the term "form" also signifies software and data structures that cause a form to be displayed. An HTML form may be derived from a template. A template is a structural and functional specification, in HTML, in which software may parse the HTML, insert and/or change values, delete sections and replicate sections of the template. In this context, the term "replication block" will be used to describe a portion of an HTML template in which there is a replication identifier to mark the beginning of a section to be replicated and another replication identifier to mark the end of the section to be replicated.

During form creation, electronic replication consists of copying the HTML between the replication identifiers, replicating the copies of HTML, some software-determined number of times, and inserting the replicated HTML between the replication identifiers, once for each replication. While being replicated, the software may further parse the replicated HTML section, and may insert and/or change values, delete sections, and so forth.

This software-process HTML template with process replication blocks, may then be rendered, as an HTML form, to the Web user's browser by the server. The web user may change, add and/or delete values from fields in the HTML form, and may submit the values to be processed by a software-implemented common gateway interface program (CGI).

When a user enters data onto a web page, the user enters data into a HTML form Then, the user can transmit the HTML form to the server by appropriately clicking on a mouse, depressing an enter key on a keyboard, or by any other control-device. When the server computer executes the form, the server computer invokes the software implemented CGI to execute the action that is specified in the HTML form.

Many times it is advantageous to return multiple values from within a replication block in an HTML form. For example, if the replication block is used to obtain input from a user, that is then used to build a command with many parameters, the replication block may contain one HTML variable for each parameter value. For example, in order to build a command such as:

"ns5250 host 1-title"my host"-wide enable'

Where the host 1 is a host name of value input by the user, the -title option value is input by the user and the -wide option value is selected by the user, the input fields in the replication block may be named as follows:

NSM_SUB_520*HOSTNAME
NSM_SUB_5250*TITLE
NSM_SUB_5250*WIDE

In this case, the user would input the values into the fields in the HTML form, press the "submit" button, and the CGI would receive POST data containing these HTML variable names and the values input by the user. (POST is a well-known method of submitting a form when communicating via the Internet.) The POST data would contain one of each of these HTML variables, and the value input by the user as follows:

NSM_SUB_5250*HOSTNAME=host1&NSM_SUB_5250*TITLE=my host&NSM_SUB_5250*WIDE=ENABLE

The user may wish to build multiple 5250 commands, and the user may wish to input a variation on the parameter values in each set of replicated fields (hence, building different variations of the same command). In this case, the replication block may contain one HTML variable for each parameter value, and may be replicated multiple times for each command the user is requesting to be built. For instance, the user may wish to build these two 5250 commands:

"ns5250 host1-title"my host"-wide enable"
"ns5250 host2.ibm.com -title "main host"-wide disable"

In this case, the replication block would be replicated two times to hold the two sets of values for the two different commands.

Just as in the first case, the user would input the values into the fields in the HTML form, press the "submit" button, and the CGI would receive POST data containing these HTML variable names and the values input by the user as follows:

NSM_SUB_5250*HOSTNAME=host1&NSM_SUB_5250*TITLE=my host&NSM_sub_5250*WIDE=ENABLE&NSM_SUB_5250*HOSTNAME-host2.ibm.com&NSM_SUB_5250*TITLE=main host&NSM_SUB_5250*WIDE=DISABLE It is possible to have more than one replication block within a HTML template. For example one HTML template may contain replication blocks for building ns5250 commands as described in the example above, and a different replication block for the parameters for a ns3270 command or a java virtual machine application command. Whenever a replication block is replicated more than once in a form, the same problem will occur in processing the POST data from that HTML form.

A straightforward but relatively time-consuming way to construct a form capable of returning multiple variables is to create a form that is tailored for each particular application. But, it is convenient and advantageous to provide a template for creating such forms, to facilitate quickly and efficiently generating the forms.

A template can include replication indicators that prompt the CGI of the server computer to parse the HTML file and substitute multiple pieces of data for each particular substitution variable. To do this, the CGI replicates the section of the HTML form that is between replication indicators in the form, with each replication corresponding to each instance of data that is to be rendered. As sections of the HTML form are replicated, the name of the replicated fields are also replicated.

Such replication results in multiple HTML fields that have the same name, but different values. This can complicate the task of the CGI in processing data received back from the web user. More particularly, when a field and its name are replicated, the name is no longer unique, and consequently the CGI cannot group the correct values with the correct field names. Furthermore, the CGI does not know a priori which data items, after replication, are to be grouped together.

A second complication that results from the use of HTML templates having replicable fields arises in the context of data validation. More specifically, the web browser of a user's computer invokes a language known as "Javascript" that is part of HTML to validate entries of the user into fields of the HTML form, and to ensure that all field entries are validated, the Javascript must know how many fields must be validated. In the case of HTML templates having replicable tables, also referred to herein as "blocks", the Javascript does not know a priori how many fields must be validated.

Preferred Embodiment Overview

An enhanced document browsing method and apparatus for creating a form from a template that includes replication blocks, that replicates at least one field in at least one replication block characterized by a block name to generate at least first and second replicated fields; modifies the block name to generate a first field name; modifies the block name to generate a second field name; associates the field names with respective ones of the first and second replicated fields; counts the number of replications; and transmits the number of replications to at least one client computer.

DETAILED DESCRIPTION

Figure 1B:
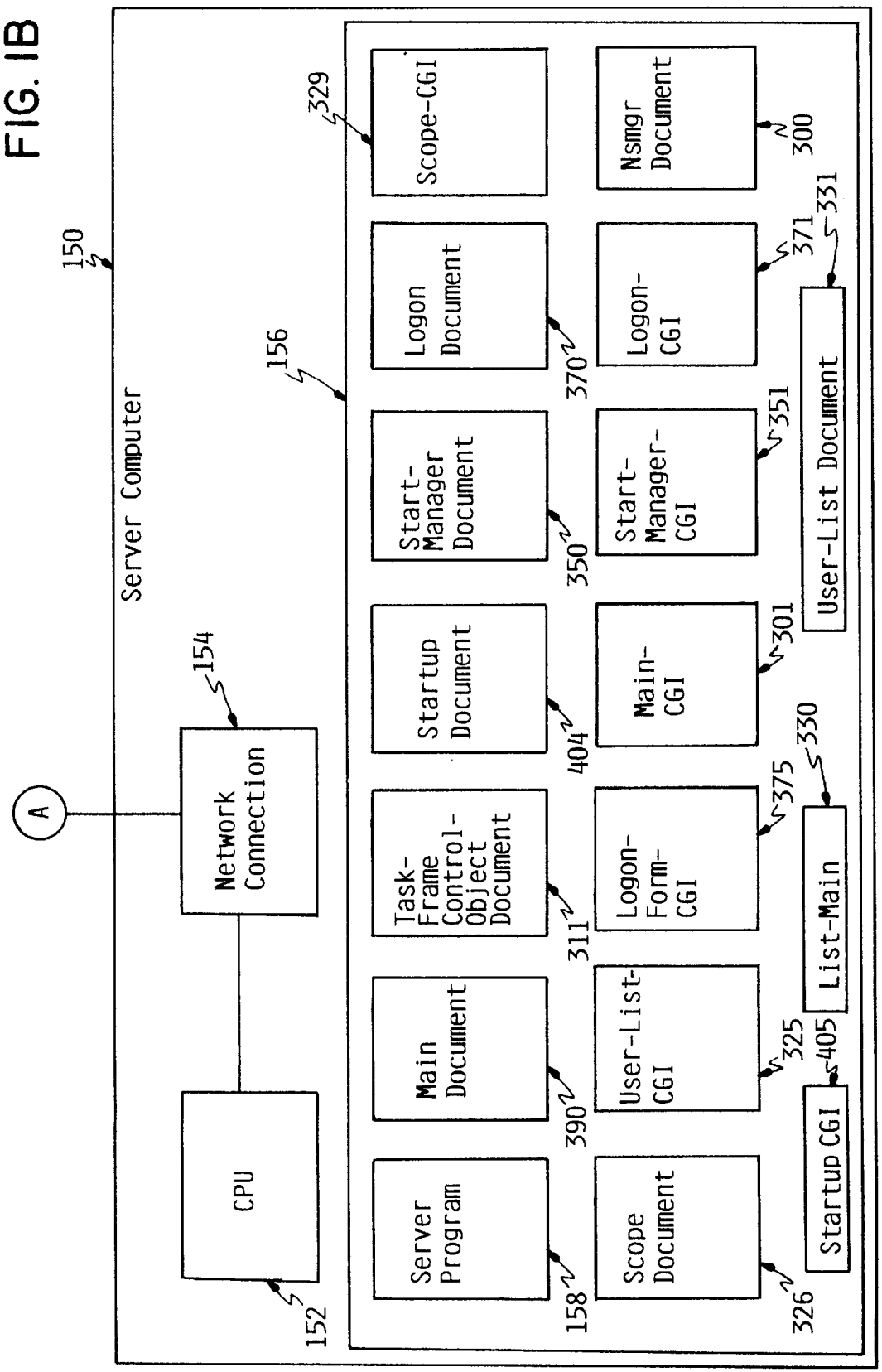

With reference now to the figures and in particular with reference to FIG. 1, there is depicted a block diagram of a data-processing system in which a preferred embodiment may be implemented. Computers 100, 146, and 147 functioning as clients are shown connected via network 145 to server computer 150. In the preferred embodiment, network 145 is the Internet, although it could be another kind of network such as a Local Area Network (LAN) or an Intranet.

Client computer 100 contains Central Processing Unit (CPU) 102, which is a processor connected via bus 112 to input device 104, display device 106, network connection 108, and memory 110. Client computer 146 contains a 5250 emulator, and client computer 147 contains a 3270 emulator. "5250" and "3270" designate different types of display terminals that support different protocols for connecting to a server computer. Thus, a 5250 emulator is a program that emulates the actions of a 5250 display terminal on client computer 146. Analogously, a 3270 emulator is a program that emulates the actions of a 3270 display terminal on client computer 147. Thus, these emulators give client computers 146 and 147 the appearance to server 150 of being the respective type of display terminal. Although client computers 100, 146, and 147 are shown as being different computers, they actually all could be the same computer; for example, client computer 100 could run both a 3270 emulator and a 5250 emulator.

Input device 104 can be any suitable device for the user to give input to client computer 100; for example: a keyboard, key-pad, light-pen, touch-screen, button, mouse, trackball, or speech-recognition-unit could be used. Display device 106 could be any suitable display device, such as a display screen, television set, or operator panel. Although input device 104 is shown as being separate from display device 106, they could be combined; for example: a display with an integrated touchscreen or a display with an integrated keyboard.

Memory 110 is storage sufficiently large to hold the necessary programming and data structures. While memory 110 is shown as a single entity, memory 110 may in fact comprise a plurality of storage devices, and that memory may exist at multiple levels, from high-speed registers and caches to lower speed but larger DRAM chips, to floppy-disk drives, fixed-disk drives, tape drives, CD-ROM drives, or optical drives. Memory 110 can be loaded and stored between its various levels as needed. While memory 110 is shown as existing entirely in client computer 100, memory 110 may in fact be remote memory that exists anywhere in network 145 or in a Local Area Network, not shown.

Memory 110 contains browser 120, downloaded documents 126, and network-processing program 124. Browser 120 can download documents from server 150 to downloaded documents 126 in memory 110 and operate on these downloaded documents as will be further described below. Although downloaded documents 126 is drawn as a single entity, it may in fact exist as multiple entities. When the discussion below refers to browser 120 interpreting documents from server 150 or executing functions in documents from server 150, it should be understood that browser 120 is actually operating on the copy of these documents that exists in downloaded documents 126.

Network-processing program 124 contains instructions that, when executed on CPU 102, provide support for connecting client computer 100 to computers in network 145 such as server computer 150.

CPU 102 is suitably programmed by browser 120 to browse documents such as downloaded documents 126. In the alternative, the function of browser 120 could be implemented by control circuitry through the use of logic gates, programmable-logic devices, or other hardware components in lieu of a processor-based system. In the preferred embodiment, browser 120 is Netscape Navigator, but browser 120 could be any kind of interpreter that interprets control-codes and scripts.

In the preferred embodiment, network connection 108 is a TCP/IP network connection, although it could be any type of suitable network connection. Client computers 100, 146, and 147 are connected to network 145 and ultimately to server computer 150 via telephone lines, cable lines, or by wireless communications. Although client computers 100, 146, 147, and server computer 150 are shown as being separate entities from network 145, they could, in fact, be part of network 145.

Server computer 150 contains Central-Processing-Unit (CPU) 152 connected via bus 153 to network connection 154 and memory 156. Network connection 154 connects server computer 150 to network 145. Memory 156 contains main-CGI 301, start-manager document 350, start-manager-CGI 351, logon document 370, logon-CGI 371, logon-form-CGI 375, scope document 326, user-list-CGI 325, main document 390, task-frame control-object document 311, startup document 404, server program 158, and network-station-manager document 300.

The various documents are HTML (Hyper Text Markup Language) documents in the preferred embodiment and are further described under the description for FIG. 3. CGI (Common Gateway Interface) programs 301, 325, 329, 351, 371, and 375 are programs invoked to process an HTML form when it is submitted from the client 100 to server 150. The operation of these various CGI programs is further described under the description for FIGS. 5–19.

Task-frame control-object document 311 contains control-codes for control-objects used by network-station-manager document 300 and referenced by network-station-manager document 300 via hyperlinks. Although task-frame control-object document 311 is shown as being contained in server computer 150, it could be on any server in network 145. Task-frame control-object document 311 is further described under the description for FIG. 3, below.

Server program 158 contains computer executable instructions that, when executed on CPU 152, provide support for connecting server computer 150 to network 145 via network connection 154 and responding to requests from client computer 100. In the preferred embodiment, server program 158 supports HTTP (Hypertext Transport Protocol).

Although only one server computer is shown in FIG. 1, there may actually be a multiplicity of server computers. Although server computer 150 is shown as being directly connected to network 145, it could be connected indirectly such as via a Local Area Network, not shown.

Client computer 100 may be implemented using any suitable client computer, such as an IBM personal computer running the OS/2® operating system. Client computer 100 could be connected directly to network 145 via network connection 108 or could be connected indirectly, such as via a Local Area Network, not shown.

Server computer 150 may be implemented using any suitable server such as the AS/400® computer system, running the OS/400® operating system, both products of International Business Machines Corporation, located in Armonk, N.Y.

Client computers 100, 146, 147 and server computer 150 could be other types of computer systems, whether they be microcomputers such as an Apple Macintosh or mainframe computers such as an IBM System/390, and still fall within the spirit and scope of this invention. In addition, client computers 100, 146, 147, and server computer 150 could be microcomputers such as described above but connected to a larger computer system. Client computers 100, 146, and 147 could also be a computer such as an Internet appliance or thin client that does not have a fixed disk drive. It will be readily appreciated that the principles of the invention may apply to other computer applications, such as other mainframes, minicomputers, network servers, supercomputers, personal computers, or workstations, as well as other electronics applications. Therefore, while the discussion herein focuses on a particular application, the invention should not be limited to the particular hardware designs, software designs, communications protocols, performance parameters, or application-specific functions disclosed herein.

Figure 2:
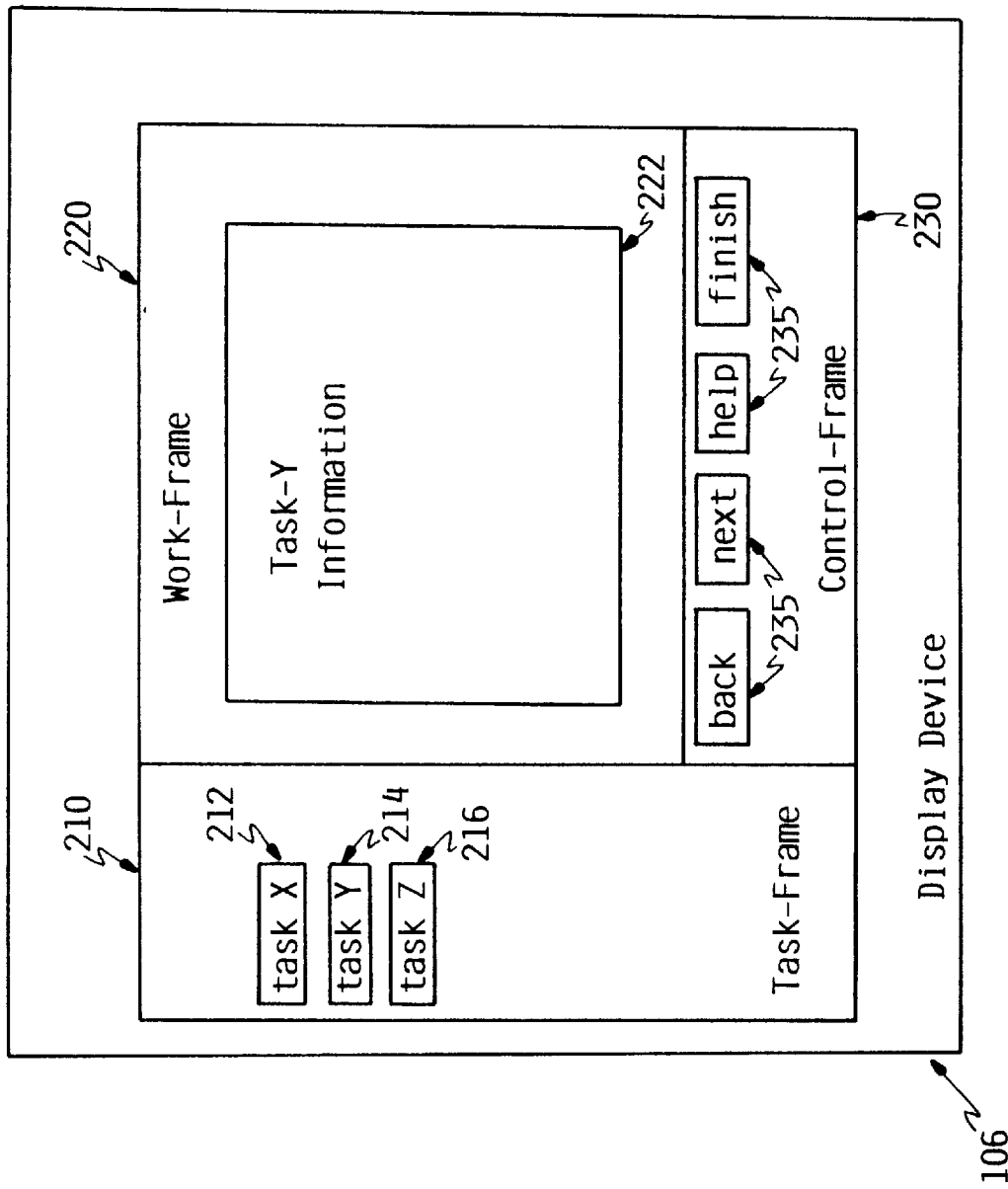
FIG. 2 is a block diagram of a browser window in a display screen, according to the preferred embodiment.
Figure 3A:
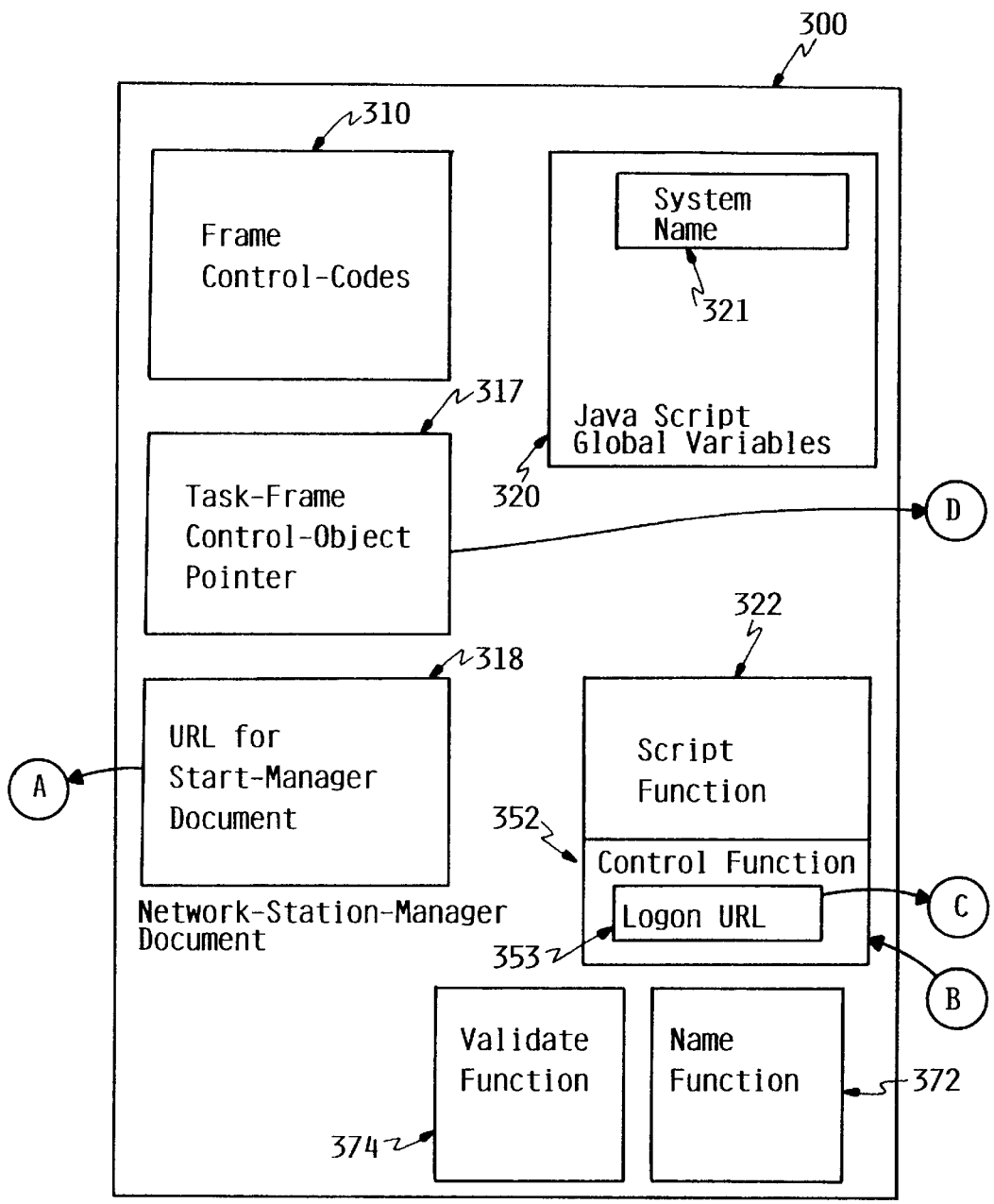
FIG. 3 is a block diagram of a main document and a task-frame control-object document, according to the preferred embodiment.
Figure 3B:
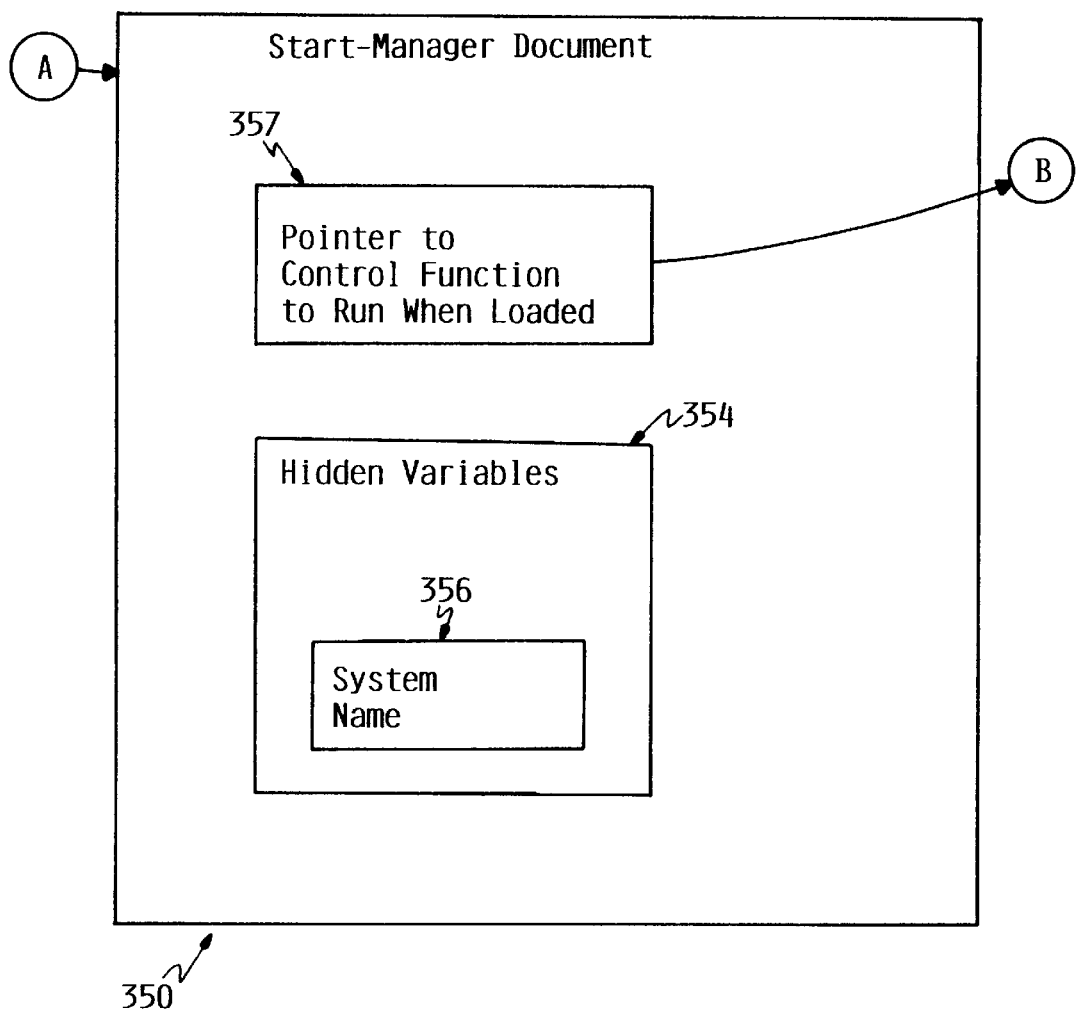
Figure 3C:
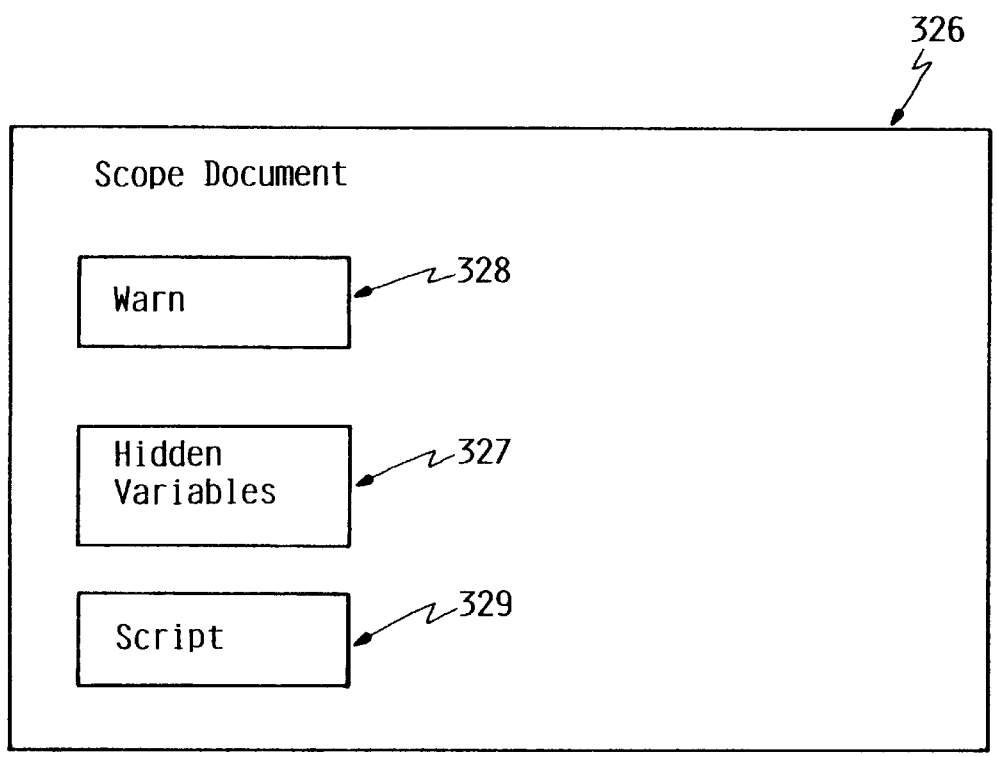
Figure 3D:
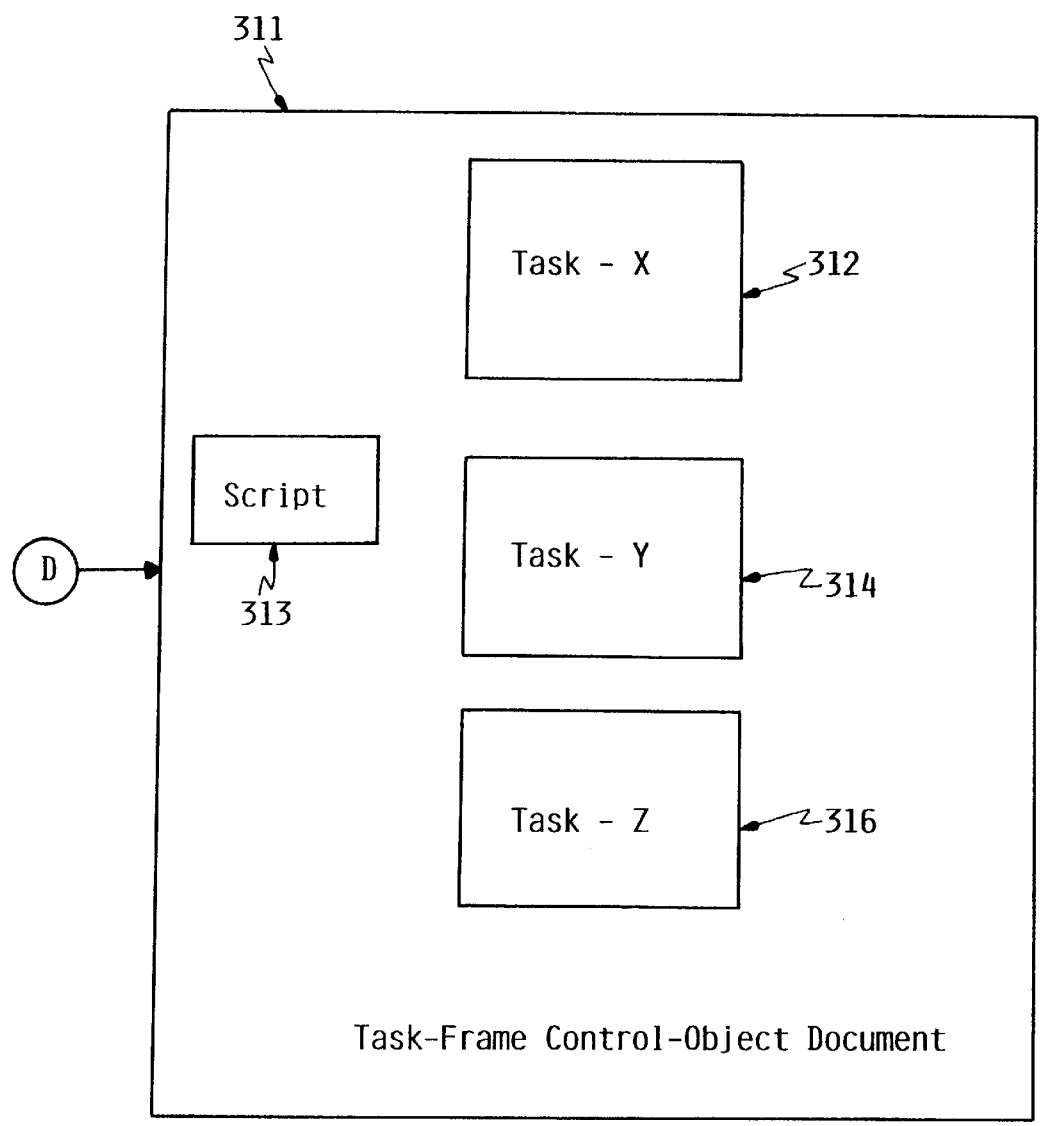
Figure 3E:
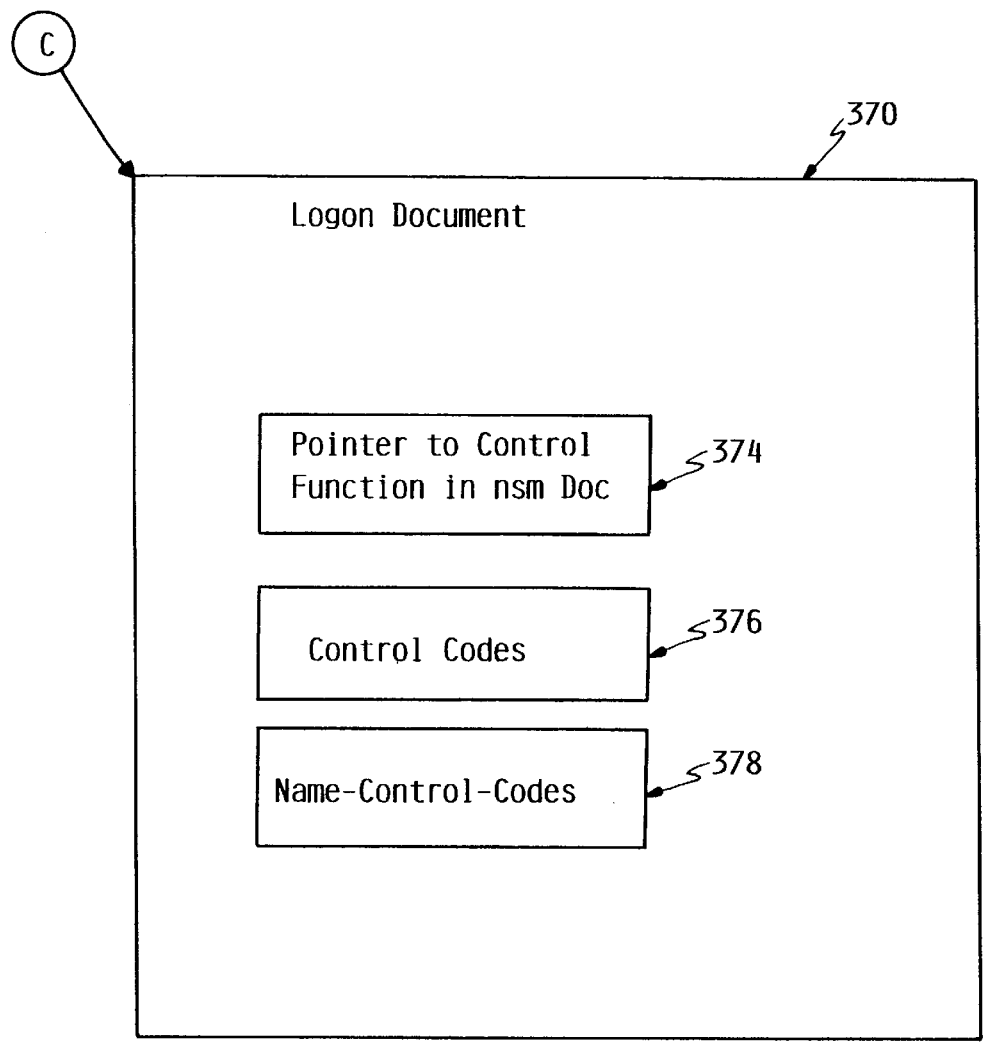
Figure 3F:
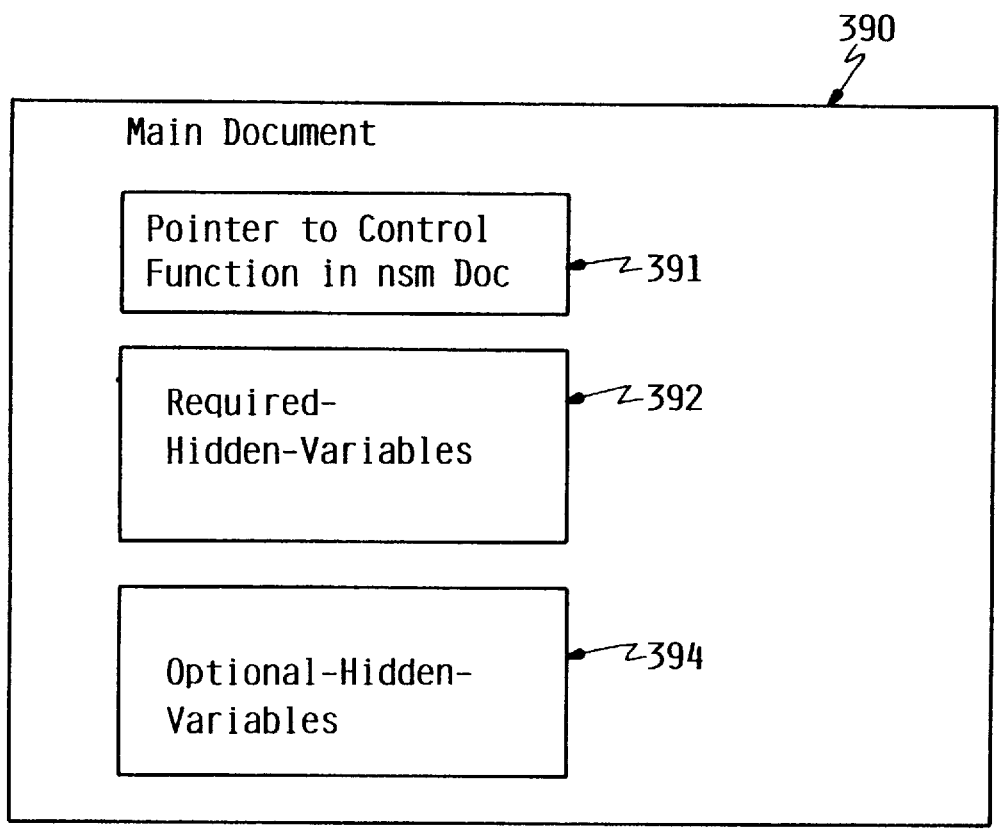

Referring to FIG. 2, there is shown a block diagram of a sample screen on display device 106. A window on display device 106 is divided into three frames: task-frame 210, work-frame 220, and control-frame 230. Browser 120 creates the frames in the window by interpreting frame control-codes 310 in downloaded network-station-manager document 300a, as further described under the description for FIGS. 3 and 5 below. Task-frame 210 contains task-x button 212, task-y button 214, and task-z button 216. Browser 120 created these task buttons by interpreting downloaded network-station-manager document 300 and task-frame control-object document 311 as further described below under the description for FIG. 3 and FIG. 5.

In the example shown in FIG. 2, the user has selected task-y button 214. This selection caused browser 120 to download task-y document 400 as downloaded task-y document 400a and display task-y information 415 as formatted task-y information 222 in work-frame 220 based on the formatting control-codes in task-y information 415. Browser 120 has further interpreted the control-codes (or control tags) in task-y document 400 and based on those control-codes has displayed control-objects 235, which in this example are buttons, in control-frame 230 as further described under the description for FIGS. 4 and 5.

As shown in control-frame 230, the sample buttons for control-objects 235 in this example are "back", "next", "help", and "finish", although a wide variety of control functions could be used, including but not limited to "OK", "cancel", "add", and "apply". Although this example uses buttons, any control-object could be used. A control-object is an object that when selected by the user, acts in operation to control the contents of the information displayed in work-frame 220, or it acts to submit information to server computer 150. Examples of types of control-objects include: a text-box or an input field for entering a line of text, a push-button for selecting an action (as in this example), a radio button for making one selection among a group of options, a check-box for selecting or deselecting a single, independent option, and a graphical or text hypertext link. In the preferred embodiment, control-frame 230 is disposed adjacent to and beneath work-frame 220, although they could be positioned anywhere.

Referring to FIG. 3, block diagram examples of network-station-manager document 300, start-manager document 350, logon document 370, main document 390, and task-frame control-object document 311 are shown, according to the preferred embodiment. Network-station-manager document 300 contains frame control-codes 310, URL for start-manager document 318, global variables 320, script function 322, control function 352, name function 372, validate function 374, and pointer to task-frame control-object document 317. Global variables 320 include help context, admin flag, scope state information, and system name 321. Control function 352 contains logon URL 353, which is the address of logon document 370. Browser 120 interprets frame control-codes 310 in order to create task-frame 210, work-frame 220, and control-frame 230.

Start-manager document 350 contains hidden variables 354 and pointer to control function 357. Pointer to control function 357 identifies the function in network-station-manager document 300 that is to be run when browser 120 loads start-manager document 350. Hidden variables 354 contain system name 356.

Logon-document 370 contains pointer to control-function 379, control-codes 376, and name-control-codes 378. Pointer to control-function 379 identifies the function in network-station-manager document 300 that browser 120 is to execute when browser 120 loads logon document 370.

Main document 390 contains pointer to control-function 391, required-hidden-variables 392 and optional-hidden-variables 394. Pointer to control-function 391 identifies the function in network-station-manager document 300 that browser 120 is to execute when browser 120 loads main document 390.

The following is an example of the script portion of network-station-manager document 300:

```
// START SCRIPTS FOR NSMGR DOCUMENT
function loadLogon() {
    identifyBrowser()
        if (parent.javaScriptFun == "BACKLEVEL") {
            alert(wrongJavaScriptVersionMsg + navigator.appVersion)
            return
        }
    checkLogon(parent.mainFrame.document.userForm)
}
function checkLogon(form) {
    // Determine if logon window needs to be surfaced. If not, just submit to the CGI
    if (form.NSM_TAG_NSMUSER.value == "0123456789") {
        form.submit()
    }
    else if (form.NSM_TAG_NSMUSER.value == "            ")
    {parent.Server =
        form.NSM_TAG_SERVER.value
        setMRI(form)
        parent.mainFrame.location.href = parent.startingMRIDir +
        "logon.htm"
    }
}
// END SCRIPTS FOR NSMGR DOCUMENT
```

The following is an example of main document 390 written in HTML format:

```
<HTML>
<HEAD>
<TITLE>Main</TITLE>
```

-continued

```
-->
</HEAD>
<BODY BGCOLOR="#FFFFFF" onLoad=
"parent.loadMainButtonFrame ()">
<IMG SRC=". . /image/ibm.gif" ALIGN=LEFT>
<STRONG>The IBM Network Station Manager helps you set up and
manage IBM
Network Station hardware and software for all of your users. </STRONG>
</CENTER>
<P><CENTER><STRONG>Select a task from the frame on the
left.</STRONG></CENTER>
<P><BR>
<FORM NAME="mainForm">
<!Required Hidden Variables>
<INPUT TYPE="HIDDEN" NAME= "NSM_TAG_PROD" VALUE=
"5733A07">
<INPUT TYPE="HIDDEN" NAME= "NMS_TAG_NSMUSER"
VALUE="DEVON'>
<INPUT TYPE="HIDDEN" NAME= "NMS_TAG_NSMIPADDR"
VALUE="9.5.35.224">
<INPUT TYPE="HIDDEN" NAME= "NSM_TAG_NSMTERM"
VALUE="NO">
<INPUT TYPE="HIDDEN" NAME= "NSM_TAG_NSMADMIN"
VALUE="YES">
<INPUT TYPE="HIDDEN" NAME= "NSM_TAG_KEY" VALUE=
"856513397_50">
<INPUT TYPE="HIDDEN" NAME= "NSM_TAG_NLV" VALUE=
"MRI2924">
<INPUT TYPE="HIDDEN" NAME= "NSM_TAG_SERVER"
VALUE="<BASE
HREF=http:
//9.5.151.42/QIBM/NetworkStation/MRI2924/>">
<!Optional Hidden Variables>
<INPUT TYPE="HIDDEN" NAME= "NSM_TAG_JVM_INSTALL"
VALUE="YES">
<INPUT TYPE="HIDDEN" NAME= "NSM_TAG_NAV_INSTALL"
VALUE="NO">
<INPUT TYPE="HIDDEN" NAME= "NSM_TAG_NSB_INSTALL"
VALUE="NO">
<!--"NSM_SUB_STOP" -->
<INPUT TYPE="HIDDEN" NAME= "panelName" VALUE="MAIN">
</FORM>
<TABLE WIDTH= 100%><TR><TD ALIGN=CENTER><FONT
SIZE=1>
5733A07
</font></td></tr></table>
</body>
</html>
```

The following is an example of script functions for main document 390:

```
// START SCRIPTS FOR MAIN DOCUMENT
function loadMainButtonFrame() {
    var buttonDoc = "<HTML><HEAD>"
    + "</HEAD><BODY BGCOLOR='#FFFFFF'><FORM>
    <CENTER>"
    + "<A HREF=
    'JavaScript:parent.showHelp(parent.selectedHelp)'"
    + onMouseOver='parent.window.status=parent.helpMsg;
    return true'>"
    + "<IMG SRC=" + parent.genImageURL() + "help.gif
    border=0><BR>"
    + "<FONT SIZE=2>" + parent.HelpText + "</FONT></A>"
    + "</CENTER><P><BR><P>"
    + "<IMG SRC='" + genImageURL() + "wait.gif" +
"'HEIGHT=1 WIDTH=1></BODY></HTML>"
    parent.buttonFrame.document.open()
    parent.buttonFrame.document.write(buttonDoc)
    parent.buttonFrame.document.close()
    var form = parent.mainFrame.document.mainForm
    parent.copyHiddenToParent(form)
    parent.JVMInstalled =
    form.NSM_TAG_JVM_INSTALL.value
    parent.NAVInstalled =
    form.NSM_TAG_NAV_INSTALL.value
    parent.NSBInstalled =
    form.NSM_TAG_NSB_INSTALL.value
    if (form.NSM_TAG_NSMADMIN.value == "YES") {
        parent.adminAuthority = true parent.selectedHelp
        = "OverHelp"
    }
    else {
        parent.adminAuthority = false
        parent.selectedHelp =
        "OverHelpI"
    }
    if (form.NSM_TAG_NLV.value != parent.NSM_TAG_NLV) {
        setMRI(form)
    }
    else {
        reloadTasks()
    }
}
function setMRI(form) {
    parent.startingMRIDir =
    parent.startingDir + form.NSM_TAG_NLV.value + "/"
    copyMRI(parent.taskFrame)
}
function getProdID() {
    var prodId=""
    if (parent.mainFrame.document != null) {
(parent.mainFrame.document.mainForm.NSM_TAG_PROD==null)
{prodId = parent.prodId
        }
        else {
            if (parent.isBlank(parent.prodId)) {
                prodId =
    parent.mainFrame.document.mainForm.NSM_TAG_PROD.value
                parent.prodId = prodId
            }
            else {
                prodId = parent.prodId
            }
        }
        parent.mainFrame.document.write(prodId + " ")
    }
}
// END SCRIPTS FOR MAIN DOCUMENT
```

The following is an example of logon document 370 written in HTML format:

```
<HTML>
<HEAD>
<TITLE>Sign on to IBM Network Station Manager</TITLE>
<HEAD>
<BODY bgcolor="#FFFFFF" onLoad="parent.clearFrame
(parent.buttonFrame); document . logForm . elements [0] . focus () ">
<CENTER>
<IMG SRC=' ../image/keys.gif' ALIGN=MIDDLE><FONT SIZE=5>
<STRONG>Sign On to IBM Network Station
Manager</FONT></STRONG>/CENTER>
<P>
<HR>
<TABLE>
<TR><TD><STRONG>AS/400 System:</STRONG></TD>
<TD><PRE></PRE></TD>
<TD><STRONG><SCRIPT LANGUAGE="JavaScript">
document.write ("" + parent.Server.toUpperCase())
</SCRIPT></STRONG>
</TD>
</TR>
</TABLE>
<FORM NAME=' logForm' METHOD=' POST' ACTION=
"/QYTC/LOGON-CGI.PGM">
<P><BR>
<CENTER>
<TABLE>
<TR>
```

```
<TD><STRONG>User</STRONG></TD></TD></TD><TD></TD>
<TD ALIGN=RIGHT><INPUT TYPE=' NAME='NSM_USEID)' value=
''maxlength=
'10' size=' 12'></TD>
</TR>
<TD><STRONG>Password</STRONG></TD><TD></TD><TD></TD>
<TD ALIGN=RIGHT><INPUT TYPE='PASSWORD' NAME=
' NSM_PW'value+''
maxlength=' 10' size=' 12'></TD>
<TR><TD></TD></TR>
<TR>
<TD COLSPAN=4 ALIGN=CENTER><INPUT TYPE="BUTTON"
NAME="subLog" VALUE="
Sign on "onClick="parent.subLogonFrm(this.form) "></TD>
</TR>
</TABLE>
</CENTER>
<INPUT TYPE="HIDDEN" NAME="panelName" VALUE="LOGON">
</FORM>
</BODY>
</HTML>
    The following is an example of script functions for logon
    document 370:
// START SCRIPTS FOR LOGON DOCUMENT
function validateInput(testElement) {
    // function to test character validity for userID and password text
    fields
    // Valid chars are A–Z, 0–9, and @,_,#,$
    var testString = testElement.value.toUpperCase()
    // Loop through the string, make sure it is in validUserIdChar.
    −1 means not
there.
    for (var i=0; i <= testString.length; i++) {
        if (validUserIdChar.indexOf(testString.charAt(i)) == −1) {
            alert(badUserCharMsg)
            testElement.focus()
            testElement.select()
            return false
        }
    }
    return true
}
function subLogonFrm(form) {
    if (!dontAllowBlankText(form.NSM_USERID, blankUserIDMsg)) {
return }
    if (!dontAllowBlankText(form.NSM_PW, blankPWMsg))
        {return} if (
        !validateInput(form.NSM_USERID)) {return} form.submit()
}
// END SCRIPTS FOR LOGON DOCUMENT
```

Figure 4A:
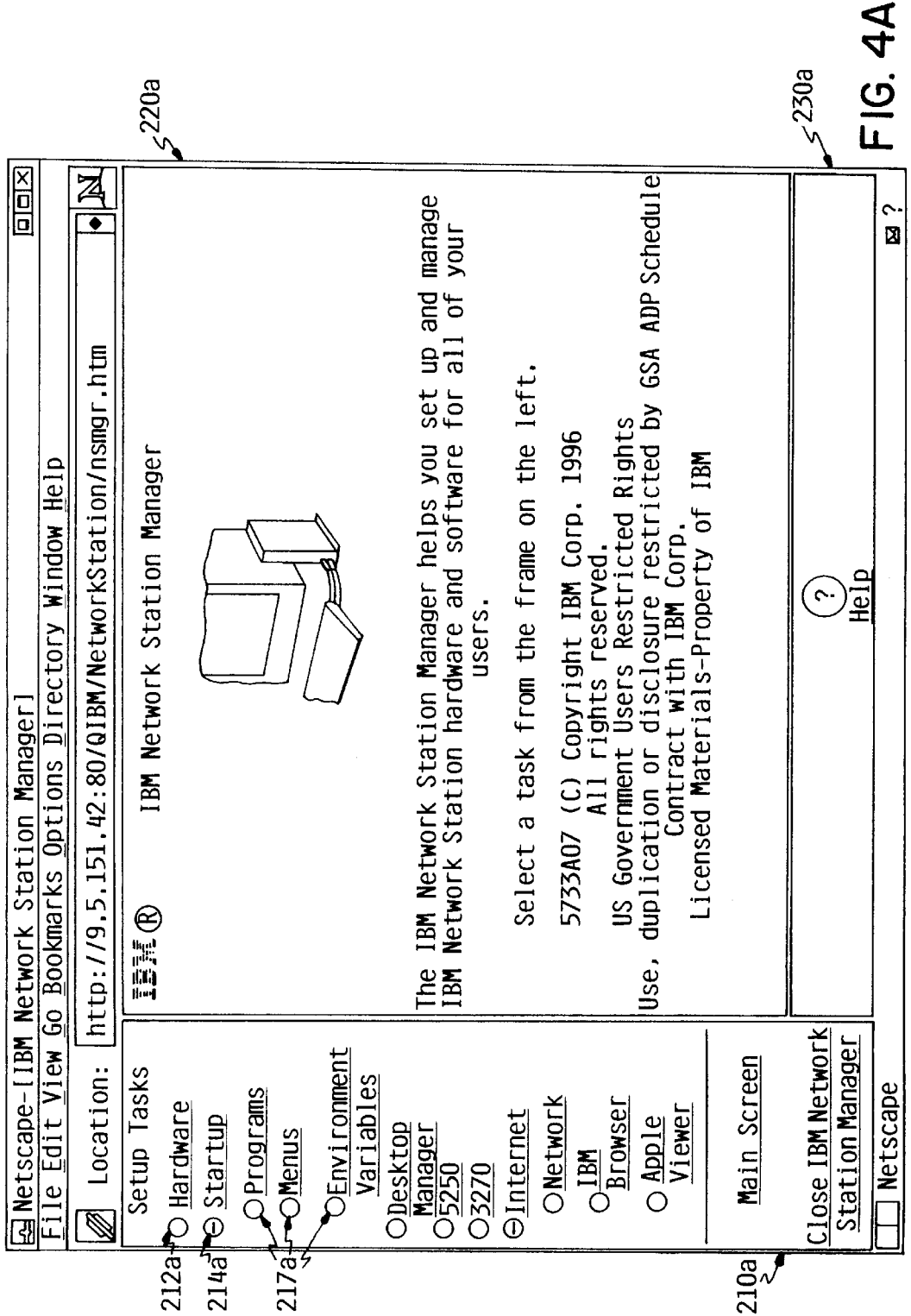
FIG. 4a is a pictorial example of a browser window for an administrative user, according to the preferred embodiment.

FIG. 4a is a pictorial example of a browser window for an administrative user, according to the preferred embodiment. The reference numerals in FIG. 4a correspond to the reference numerals in FIG. 2, with the addition of the "a" suffix. The browser window contains task-frame 210a, work-frame 220a, and control-frame 230a. Task-frame 210a contains selection objects 212a, 214a, and 217a. Selection objects 217a are sub-objects to 214a. The operation of the preferred embodiment with respect to FIG. 4a is further described under the description for FIG. 9, below.

Figure 4B:
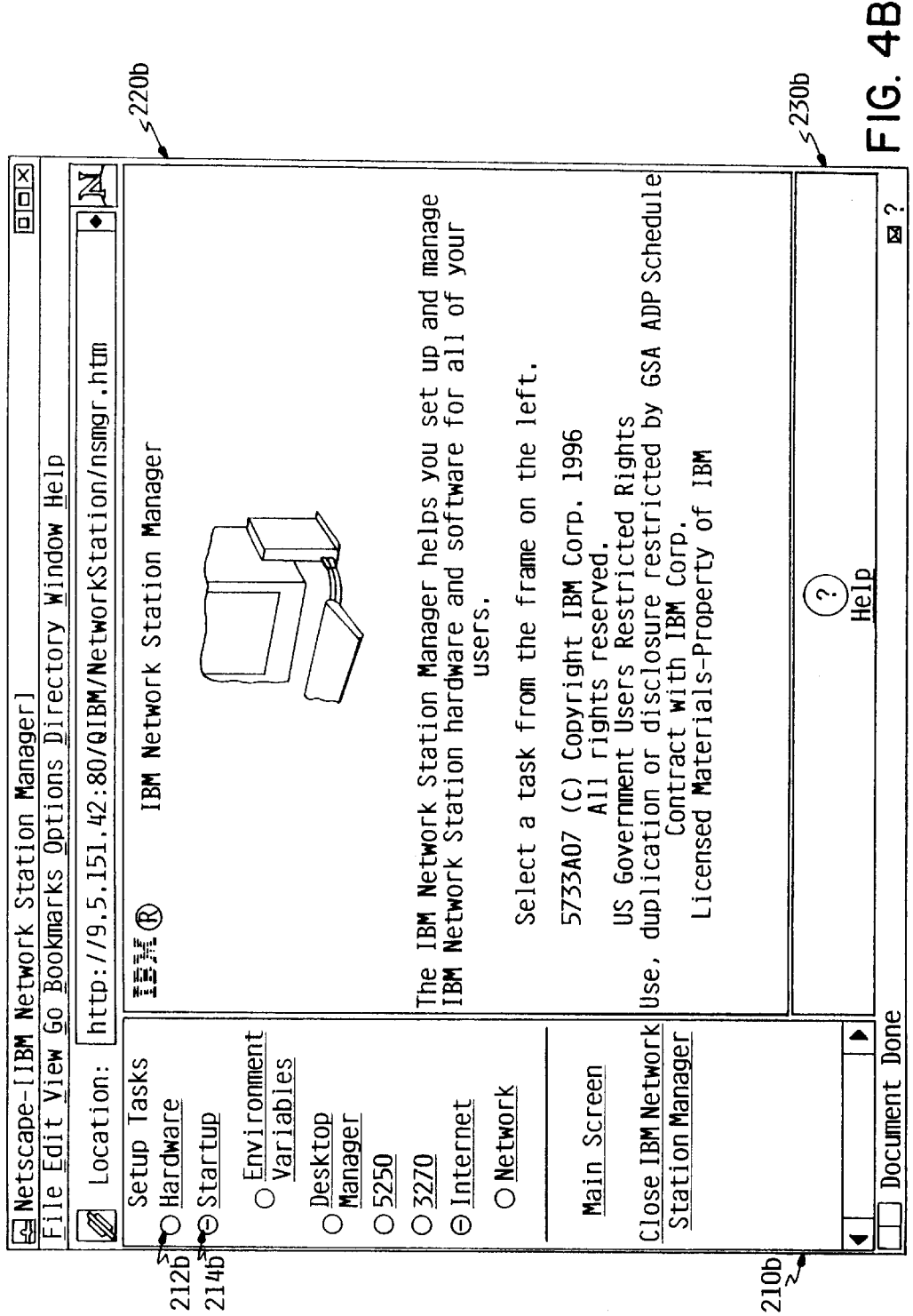
FIG. 4b is a pictorial example of a browser window for a non-administrative user, according to the preferred embodiment.

FIG. 4b is a pictorial example of a browser window for a non-administrative user, according to the preferred embodiment. The reference numerals in FIG. 4b correspond to the reference numerals in FIG. 2, with the addition of the "b" suffix. Task-frame 210b contains selection objects 212b, 214b, and 217b. Selection objects 217a are sub-objects to 214. The operation of the preferred embodiment with respect to FIG. 4b is further described under the description for FIG. 9, below.

Figure 5:
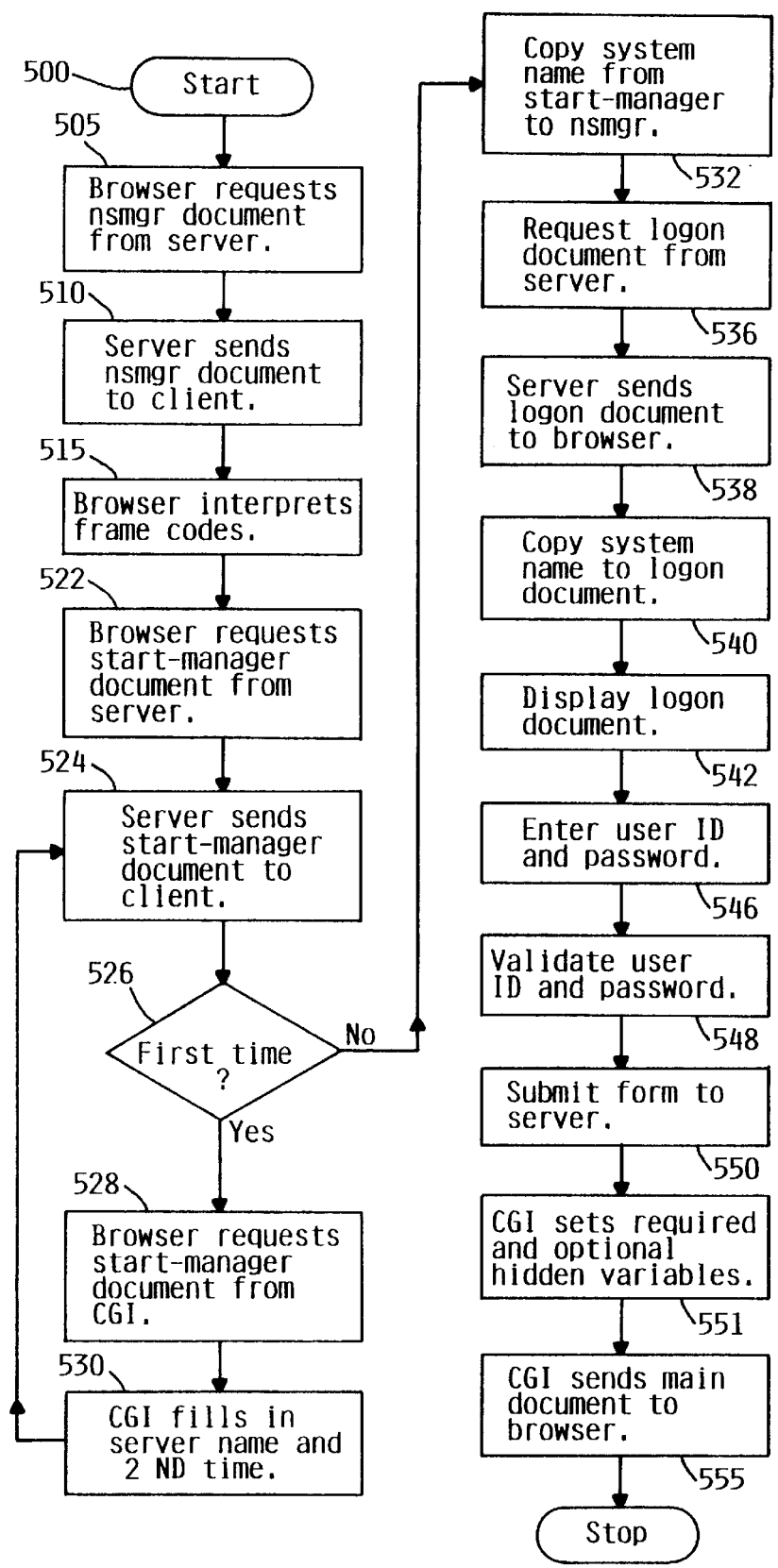
FIGS. 5 and 6 are flowcharts that show the process steps when the user at a client signs on to a server, according to the preferred embodiment.

An example operation of the preferred embodiment, as shown in the flowchart of FIG. 5, will now be described in more detail. The example starts at block 500. At block 505, browser 120 at client computer 100 requests invocation of main-CGI 302 at server computer 150. Browser 120 could do this on its own initiative or it could request network-station-manager document 300 in response to a user entering a URL. At block 510, server computer 150 invokes main-CGI 302, which processes the request and sends network-station-manager document 300 to client 100. At block 515, browser 120 interprets frame control-codes 310 in order to display task-frame 210, work-frame 220, and control-frame 230. At block 522, browser 120 requests start-manager document 350 using URL for start-manager 318 in network-station-manager document 300. At block 524, server 150 sends start-manager document 350 to browser 120. At block 526, browser 120 executes control-function 352, which checks whether this the first time that browser 120 has processed start-manager document 350.

If control-function 352 determines that this is the first time that browser 120 has processed start-manager document 350, then control continues to block 528, where control-function 352 submits a form to server 150, which invokes start-manager-CGI 351 at server 150. At block 530, start-manager-CGI 351 processes the form, copies the system name that the user is accessing into system name 356 in hidden variables 354 of start-manager document 350, and sets an indicator in control-function 352 to indicate that this is the second time. Control then returns back to block 524.

If control-function 352 determines that this is not the first time that browser 120 has processed start-manager document 350, then control continues to block 532 where control-function 352 copies system name 356 in start-manager document 350 to system name 321 in network-station-manager document 300. At block 534, control-function 352 opens a logon window on display 106. At block 536, control-function 352 sends a request to server 150 for logon document 370, using logon URL 353.

At block 538, logon-CGI 371 processes the request and sends logon document 370 to client 100. At block 540, browser 120 interprets control-codes 376 in logon document 370 and invokes name-function 372, which reads system name 321 from network-station-manager document 300 and creates name-control-codes 378 in logon document 370 that contain the value of system name 321. At block 542, browser creates a logon screen in the logon window on display 106, in response to interpreting control-codes 376 in logon document 370.

At block 546, the user enters a user-id and password into the logon screen. At block 548, validate-function 374 validates the user-id and password. At block 550, browser 120 sends a form with the validated user-id and password to server 150, in response to interpreting control-codes 376 in logon document 370. The form identifies logon-form-CGI 375 and also contains a URL for main document 390.

At block 551, logon-form-CGI 375 processes the form and sets required hidden variables 392 that will be needed by each future CGI program associated with this logon in main document 390. Examples of required hidden variables 392 are user-id, IP address, national language version, whether the client is a network station or PC, and the authority or security level of the user, e.g., whether the user is an administrative or a non-administrative user. Logon-form-CGI 375 also sets optional-hidden-variables 394 that indicate which products are installed on server 150 that are available for the user to access; for example whether server 150 supports Java, Netscape, or Spyglass. At block 555, logon-form-CGI 375 sends main document 390 to client 100.

Figure 6:
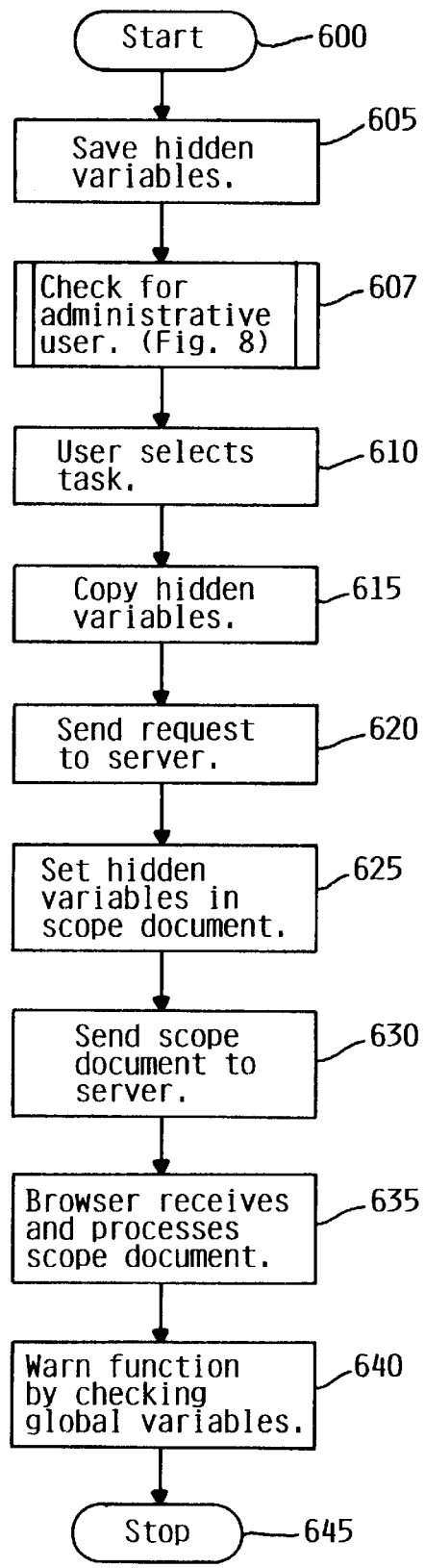

Control now continues to FIG. 6, where at block 605, browser 120 receives and loads main document 390 and invokes script function 322 in network-station-manager document 300. Browser 120 finds script function 322 using pointer to function 391. Script function 322 copies required hidden variables 392 and optional hidden variables 394 from main document 390 to global variables 320. Script function 322 also saves a variable in global variables 320 that determines which help file to use (context-sensitive help) and saves if the user is an administrator or not. At block 607, processing for administrative and non-administrative users is done, as is further described under the description for FIG. 8, below. At block 610, the user selects startup task using startup control-object 212 in task-frame 210. This invokes script function 322, which copies hidden variables in global variables 320 from network-station-manager document 300 to the form to be submitted. It also sets new hidden variables in main document 390 for the client that is being requested into the form. At block 620, browser 120 sends the form to server 150, which invokes scope-CGI 329, which copies hidden variables from the submitted form into hidden variables 327 in scope document 326 at block 625. At block 630, scope-CGI 329 sends scope document 326 to client 100. At block 635, browser 120 processes scope document 326A and invokes script function 322 to copy hidden variables 327 to global variables 320 in network-station-manager document 300. The contents of block 635 are discussed in more detail below under the description for FIG. 7. Browser 120 also sets the correct help text value, so that if the user selects the help control-object from control-frame 235, the correct help for the current context will be displayed. The operation of context-sensitive help is further described below under the description for FIG. 10. Scope document 326 contains warning function 328, which warns the user if the user is trying to set values for a product that is not installed. This is done by using global variables 320 in network-station-manager document 300.

Figure 7:
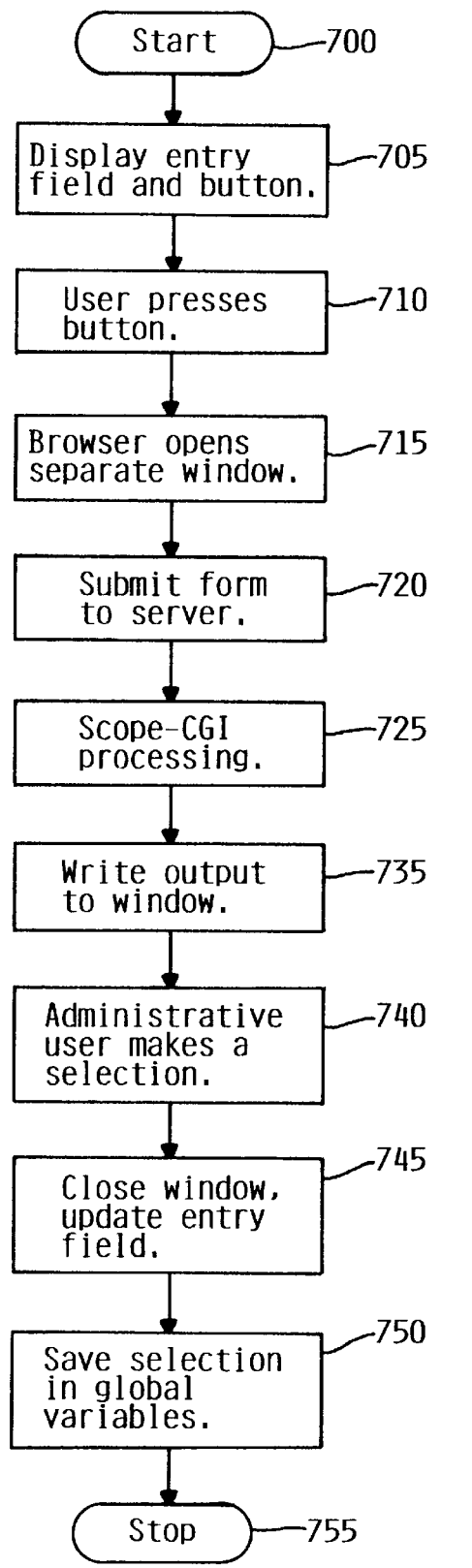
FIG. 7 is a flowchart that shows the process steps for processing of a scope operation, according to the preferred embodiment.

Referring to FIG. 7, at block 700, processing for the scope document begins. The purpose of the scope document is to enable an administrative user to bring up a list of regular users and to set preference file information for them, as will be described below. At block 705, browser 120 interprets scope document 326 and displays an entry field and a button on display device 106. At block 710, the administrative user presses the button. At block 715, in response to the user pressing the button, browser 120 interprets scope document 126 and opens a separate window and submits a HTML form to server 150. Associated with the submitted form is an identification of user-list-CGI 325 and a request for user-list-CGI 325 to put its output in the newly created separate window. In response to receiving the HTML form, server 150 invokes user-list-CGI 325, which creates a list of all defined users capable of logging on to server 150. Also at block 725, user-list-CGI sends the list of users in the form back to client 100. At block 735, browser 120 interprets the form and writes the output to the newly created separate window. At block 740, the administrative user selects a regular user from the list of users that browser 120 put in the separate window and presses a button. At block 745, in response to the user pressing the button, browser 120 closes the window and puts the selected entry into the entry field. At block 750, script function 322 saves the user selections from the entry field in global variables 320 of network-station-manager 300. Later when another application is selected, such as another task in task-frame 210, its scope panel will use script function 322 to update its HTML form with the saved information from global variables 320.

Figure 8:
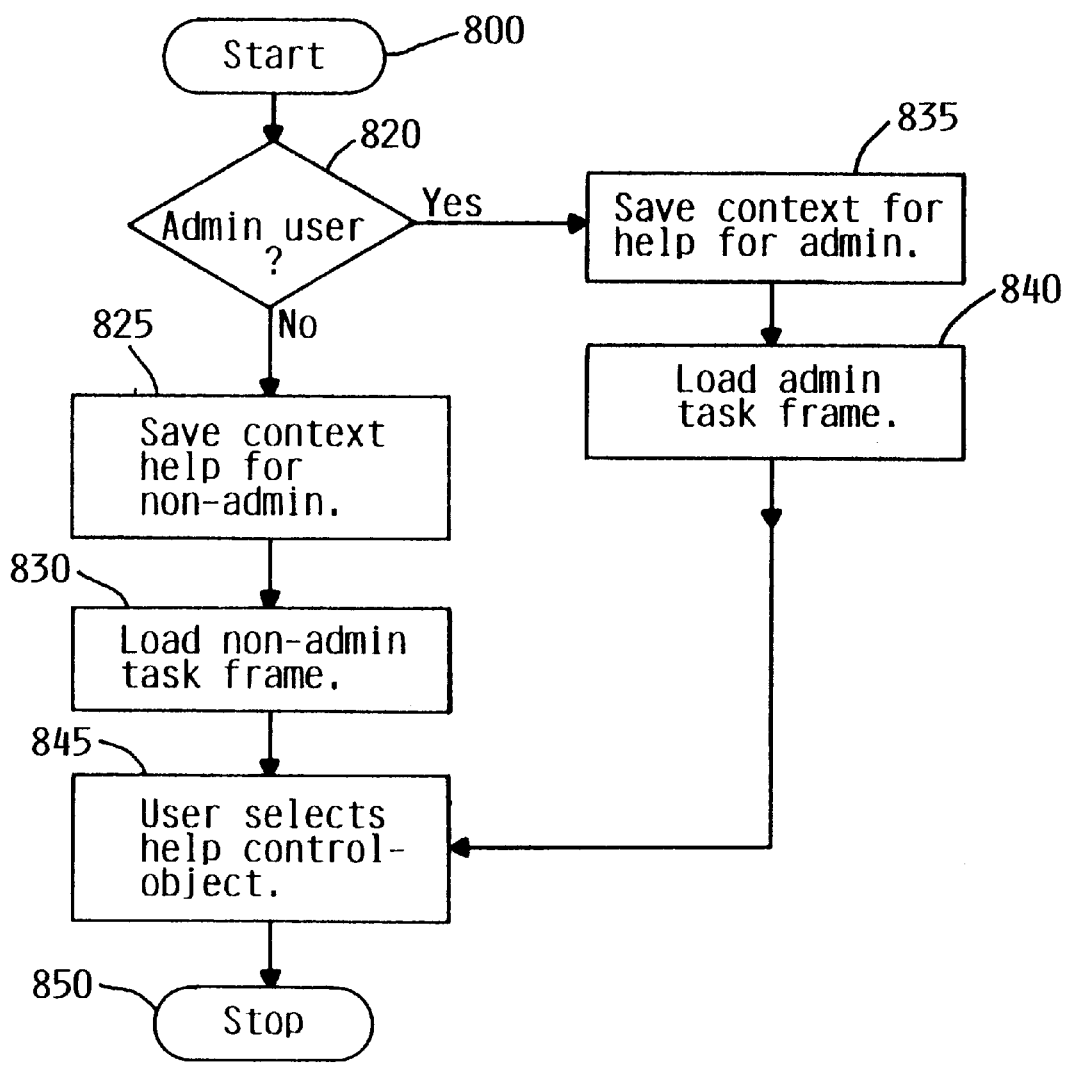
FIG. 8 is a flowchart that shows the process steps to handle checking for administrative and non-administrative users, according to the preferred embodiment.

FIG. 8 is a flowchart that shows the process steps to handle checking for administrative and non-administrative users. Although FIG. 8 is being described in the context of the startup task, it could be applicable to any CGI program and document. Referring to FIG. 8, control starts at block 800. At block 820, browser 120 executes script function 322 to determine whether the user is an administrative-user. If the user is an administrative-user, control continues to block 835 where script function 322 saves the context for help for an administrative-user in global variables 320. In the preferred embodiment the context for help is a URL that identifies the page of help text that corresponds to the page being displayed for startup document in work-frame 220 on display device 106. Control then continues to block 840, where browser 120 writes the contents of task-frame 210 as appropriate for an administrative-user, an example of which is shown in FIG. 4a. Control now continues to block 845 where the user selects help button 236. In response to this selection, browser 120 invokes script function 322, which retrieves the context for the help from global variables 320 and displays the appropriate help page on display device 106. Script function 322 constructs a URL based on the context and submits it to the server 150, which transmits the appropriate help document. Script function 322 then opens a window on display device 106 and displays the retrieved help document. Control now continues to block 850 where the routine returns.

If the user was not an administrative-user at block 820, control continues to block 825 where browser 120 invokes script function 322, which saves the context for help for a non-administrative-user in global variables 320. In this way the help text for administrative and non-administrative users is different. Control now continues to block 830, where script function 322 loads the contents of task-frame 210 as appropriate for a nonadministrative-user, an example of which is shown in FIG. 4b. Control now continues to block 845, as previously described.

Figure 9:
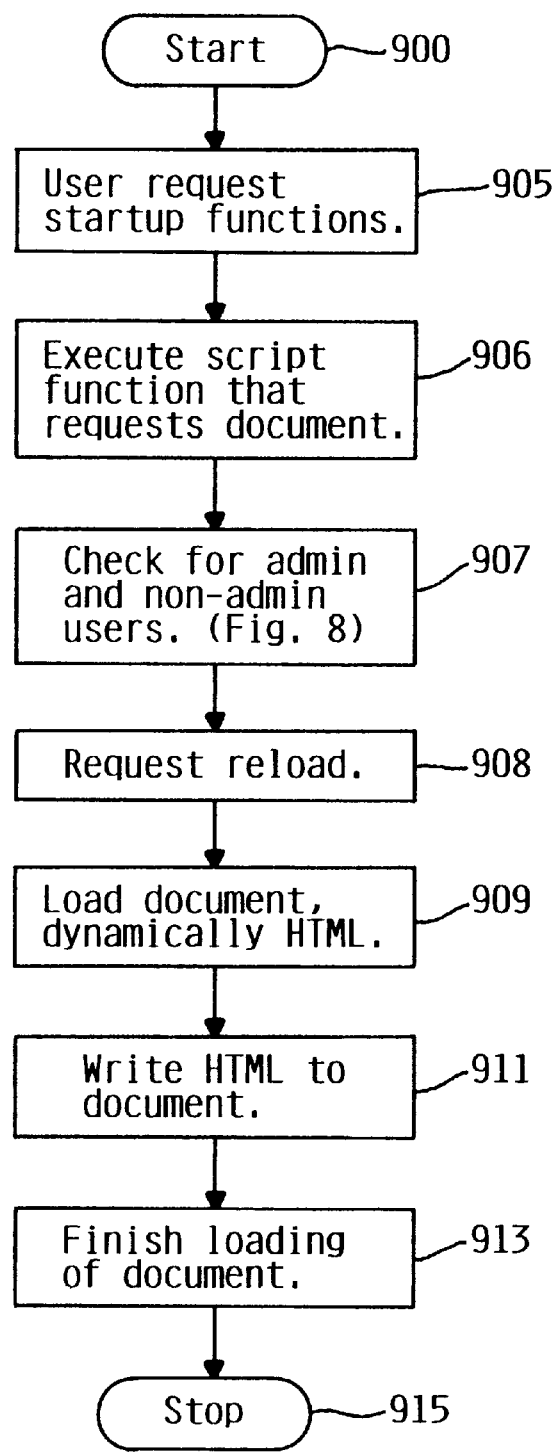
FIG. 9 is a flowchart that shows the process steps to expand a task control-object, according to the preferred embodiment.
Figure 18:
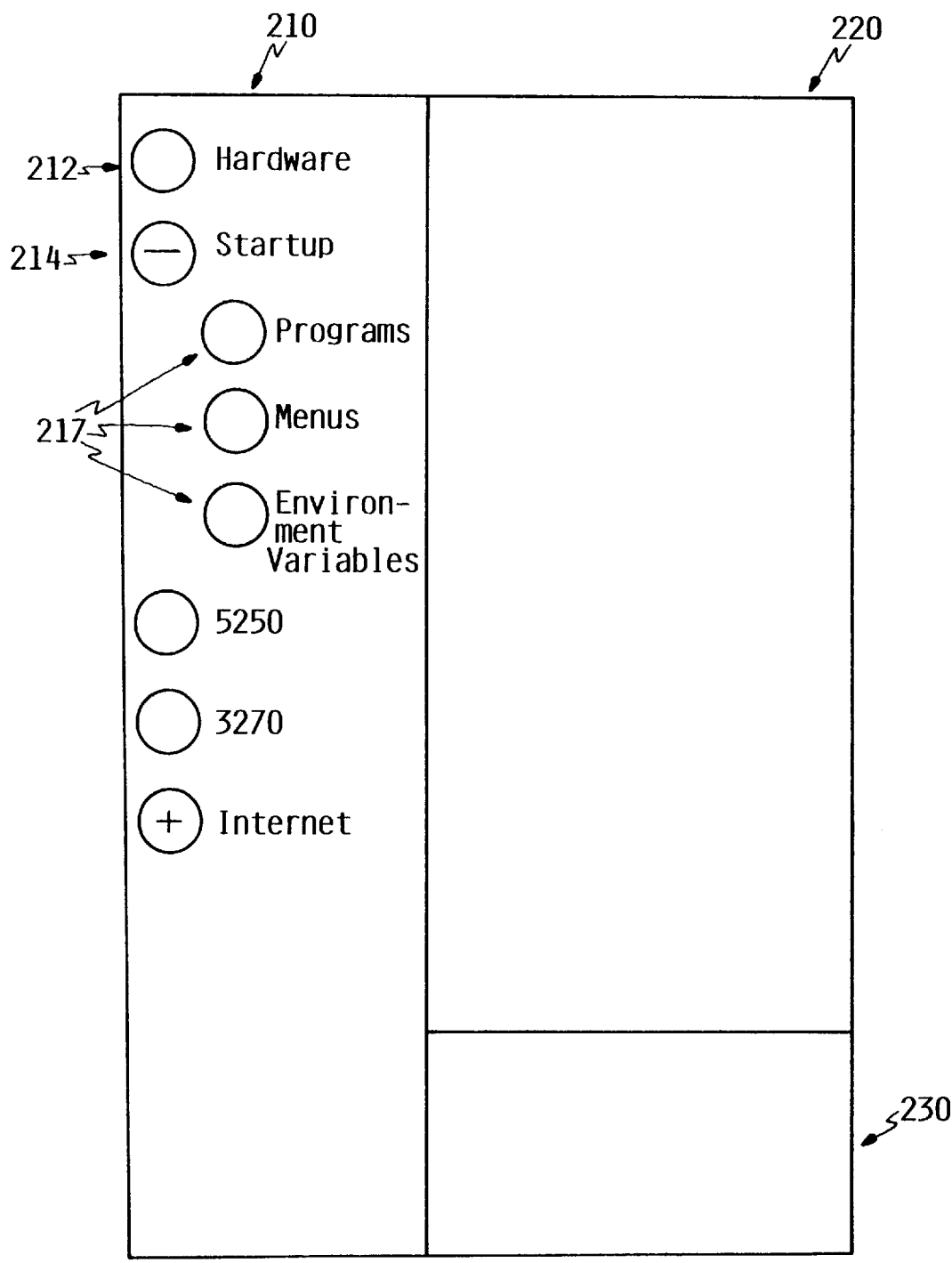
FIG. 18 is a block diagram of an example of a task-frame in a browser window after expansion, according to the preferred embodiment.
Figure 19:
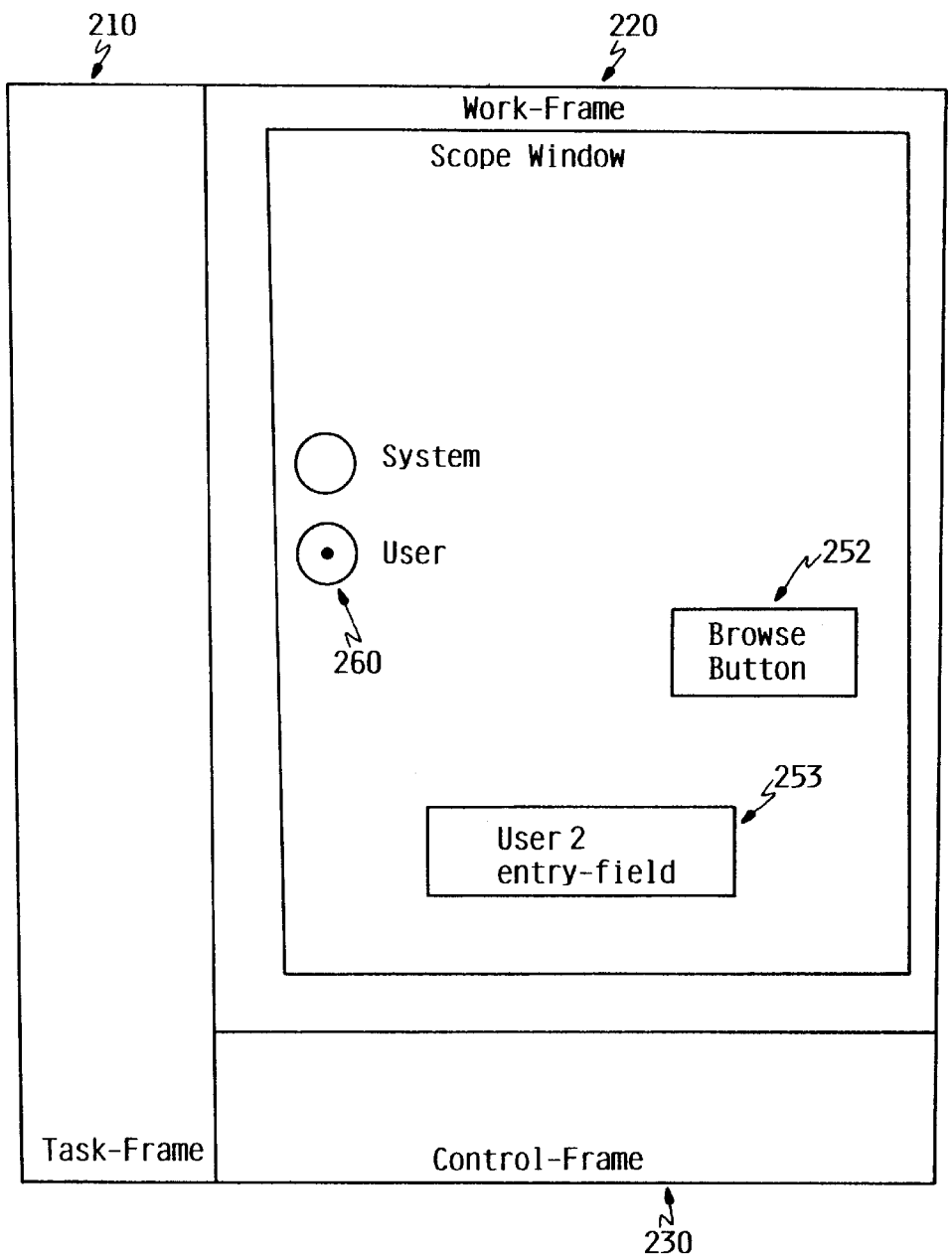
FIG. 19 is a block diagram of an example of a scope window, according to the preferred embodiment.

FIG. 9 shows the logic when the user selects a task from task-frame 210. Although the logic will be described in the context of the startup task, it applies by analogy to any task in task-frame 210. Control starts at block 900. At this point, the browser window is in the state shown in FIG. 17. At block 905, the user selects startup-selection-object 214 of FIG. 17 (214a of FIG. 4a). At block 906, in response to the selection of startup-selection-object 214, browser 120 executes script function 322 to set variable named "expanded startup" to true and saves it in global variables 320 in network-station-manager document 300. At block 907, script function 322 checks for an administrative user, as further described under the description for FIG. 8, above. At block 908, script function 322 sends a request to server 150 to reload task-frame control-object document 311. At block 909, server 150 sends task-frame control-object document 311 to browser 120, which invokes script function 313 in task-frame control-object document 311 to dynamically recreate the HTML, using "expanded startup" from global variables 320, in task-frame control-object document 311 to display sub-task selection-objects 217, as shown in FIG. 18. At block 911, script function 313 in task-frame control-object document 311 writes the newly created HTML into task-frame control-object document 311. At block 913, browser 120 finishes loading of task-frame control-object document 311. The state of the browser window is not as shown in FIG. 18. At block 915, processing is complete.

An example of the control-codes in startup document 404 is shown in the following sample HTML and JavaScript:

```
<HTML>
.
.
.
<SCRIPT LANGUAGE = Java Script>
function expand Startup () {
expanded startup = ! expanded startup
parent.reload Tasks ()
.
.
.
</SCRIPT>
<BODY>
[HTML to write out "setup Tasks"]
<SCRIPT LANGUAGE = Java Script>
text=
[HTML for hardware]
if expanded startup = true; add to text
[HTML for - graphic and the word "startup"]
[HTML for submenu graphics & Context]
else if expanded startup = false, add to text
[HTML for + graphic and the word "startup"]
.
.
.
[add rest of HTML to text]
.
.
.
document.write (text)
</script>
.
.
.
[HTML for rest of document]
```

Figure 10:
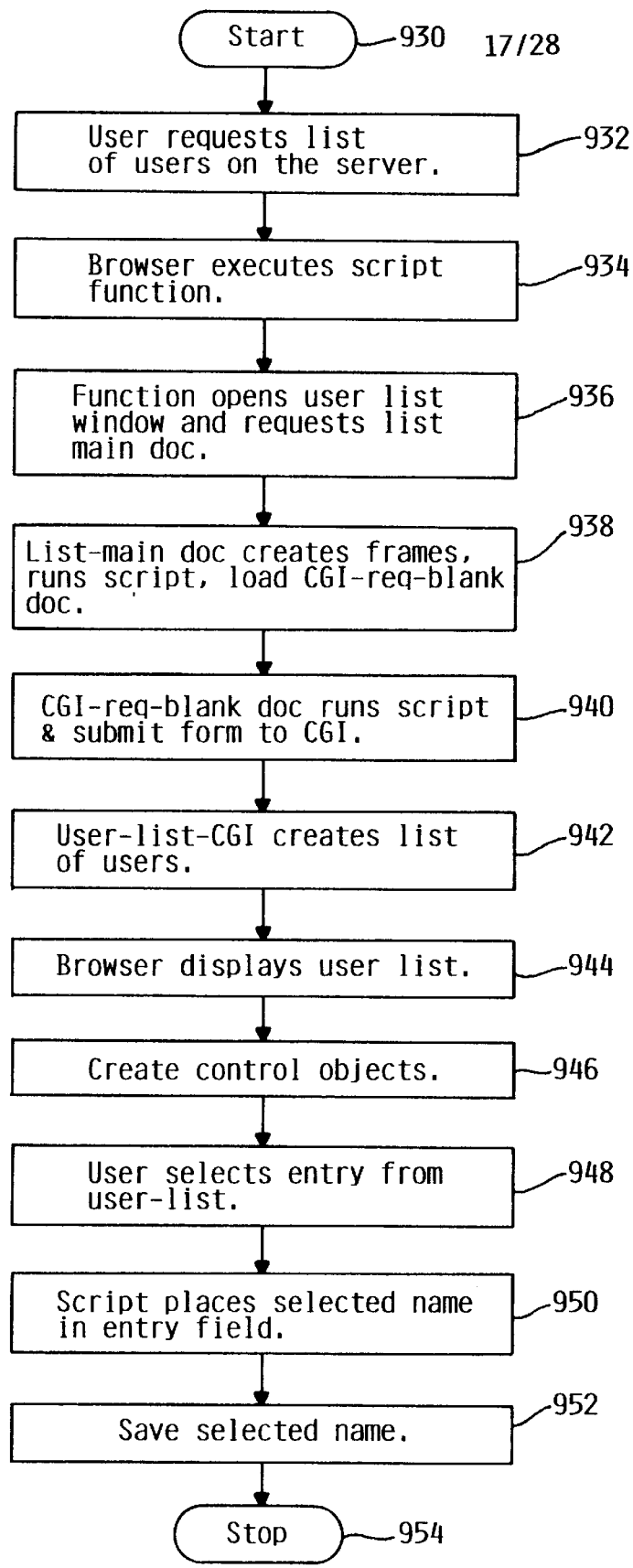
FIG. 10 is a flowchart that shows the process steps for processing the selection of a task from a control-object in the task frame, according to the preferred embodiment.
Figure 20A:
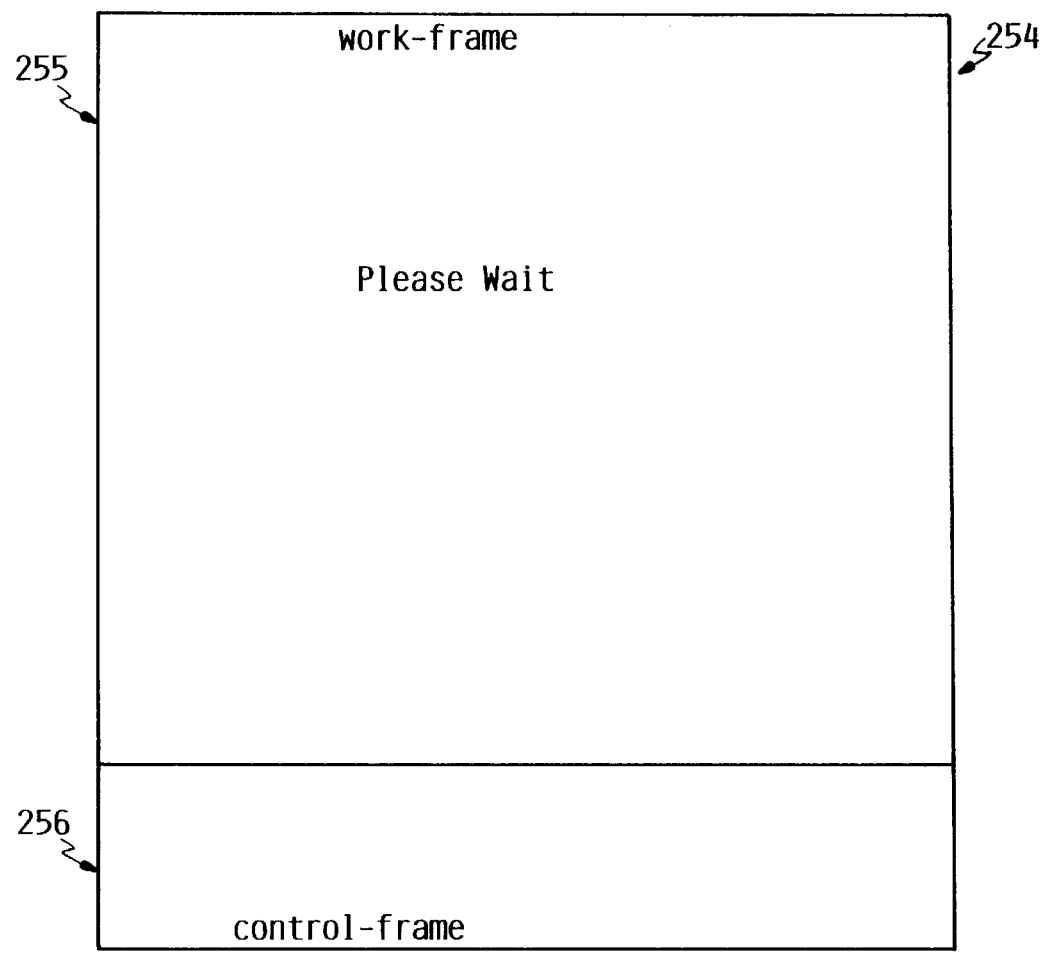
FIGS. 20a and 20b are block diagrams that depict two different states for a user-list window, according to the preferred embodiment.
Figure 20B:
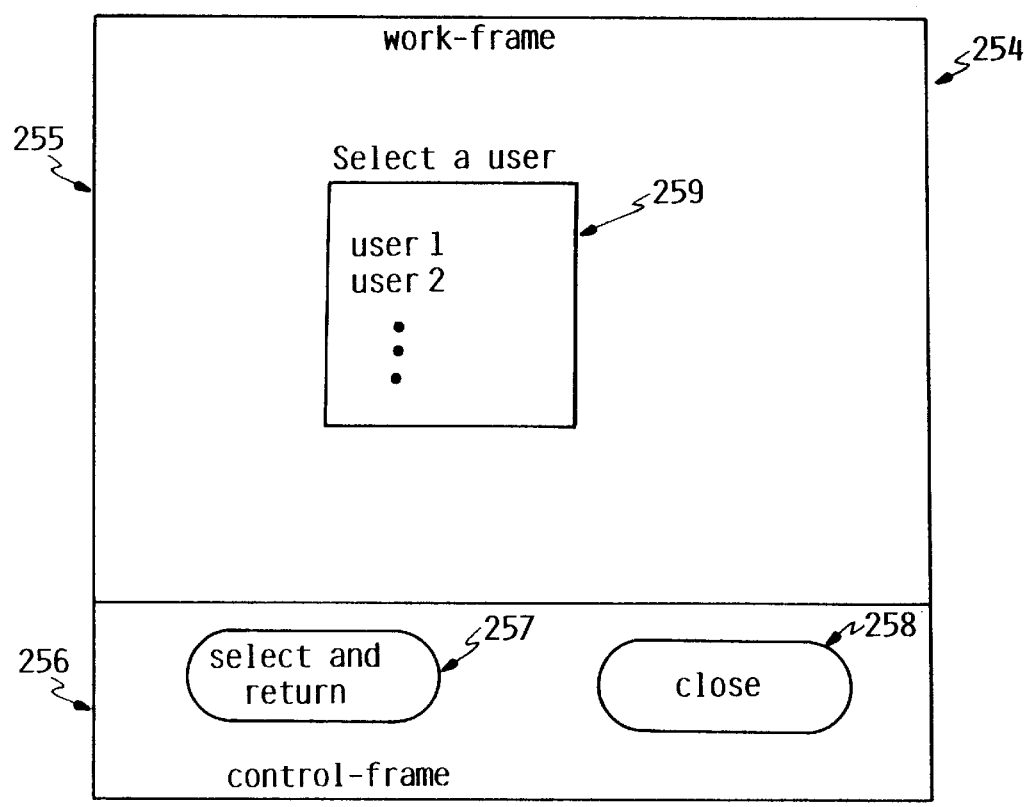

FIG. 10 is a flowchart that shows the process steps for processing the selection of a task by an administrative user from a control-object in the task frame, according to the preferred embodiment. Processing starts at block 930. At block 932, the administrative user selects browse button 252 on FIG. 19 to request a list of users from server 150. At block 934, browser 120 invokes script function 329 in scope document 326. At block 936, script function 329 opens user-list window 254, as shown in FIG. 20a, and sends a URL to server computer 150 requesting list-main document 300. At block 938, server computer 150 sends list-main document 330 to browser 120, which displays it in user-list window 254. List-main document 330 contains control codes that specify frames 255 and 256, as shown in FIG. 20. List-main document 330 contains a script function that puts a "please wait" message in work-frame 255, and a CGI-requesting-blank document in control-frame 256, as shown in FIG. 20a. At block 940, the CGI-requesting-blank document contains a script function that copies global variables into a form, specifies work-frame 255 as the target for the result, and submits the form to user-list-CGI 325 at server 150. At block 942, server 150 invokes user-list-CGI 325, which determines a list of users, adds the list of users to user-list document 331, and sends user-list document 331 to browser 120. Browser 120 displays user-list document 331 in work-frame 255 as page 259 in place of the "please wait" message, as shown in FIG. 20b. At block 946, browser 120 further interprets user-list document 331, which contains control-codes for select-and-return control-object 257 and close control-objects 258, in order to place these control-objects into control-frame 256, as shown in FIG. 20b.

At block 948, the user highlights an entry in page 259 and selects select-and-return control-object 257. At block 950, the selection of control-object 257 invokes script function 322 in network-station-manager document 300 that retrieves the selected name from page 259 and places it in entry-field 253 (FIG. 19), selects radio button 260 (FIG. 19) (if not already selected by the user), and closes user-list window 254. At block 952, script function 322 saves the selected user name for later use by this panel and closes user-list window 254, and submits the selected user name to server 150, in order to set configuration parameters. At block 954, processing concludes.

Figure 11:
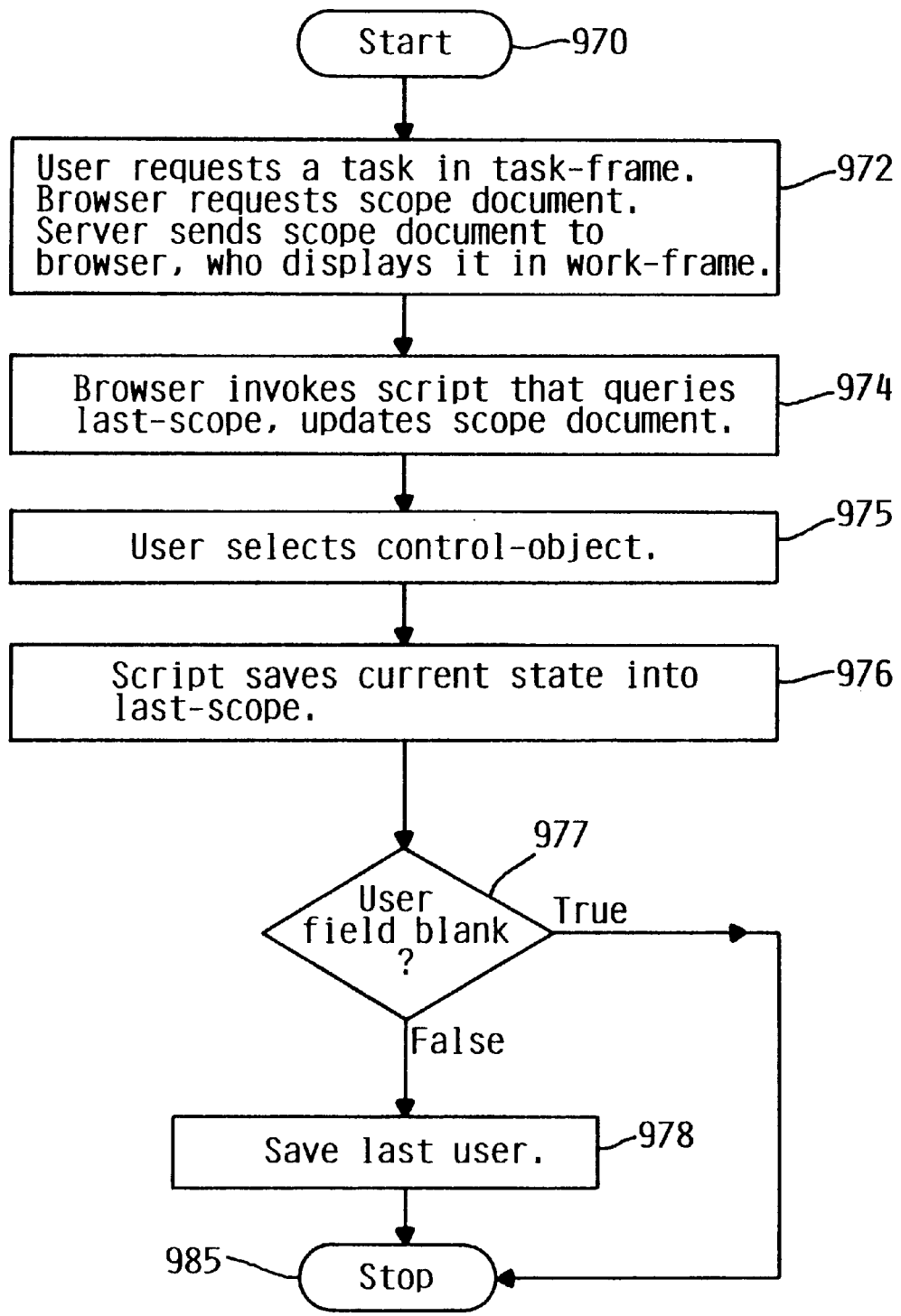
FIG. 11 is a flowchart that shows the process steps when the user selects any task in a task-frame, according to the preferred embodiment.

FIG. 11 shows the logic that is invoked when the user selects any task in task-frame 210. At block 970 processing starts. At block 972, the user requests any task in task-frame 210. In response to this selection, browser 120 submits a form to server 150 to request scope document 326. Server 150 sends scope document 326 to browser 120, which display it work-frame 220. At block 974, browser 120 invokes script function 322 in network-station-manager document 300, which queries the "last-scope" global variable in global variabless 320 to see which one of the radio buttons in the displayed scope panel is to be selected and updates scope document 326 with that correctly selected radio button and with the previously saved user information, which was stored in the "last-user" global variable in global variables 320.

At block 975, the user selects a control-object in control-frame 230. At block 976, script function 322 in network-station-manager document 300 saves the current state of the radio buttons into global variable "last-scope".

At block 976, script function 329 checks if entry-field 253 (FIG. 19) is blank. If it is not blank, at block 978, the contents of entry-field 253 is saved in global variable "last user". At block 985 processing concludes.

Figure 12:
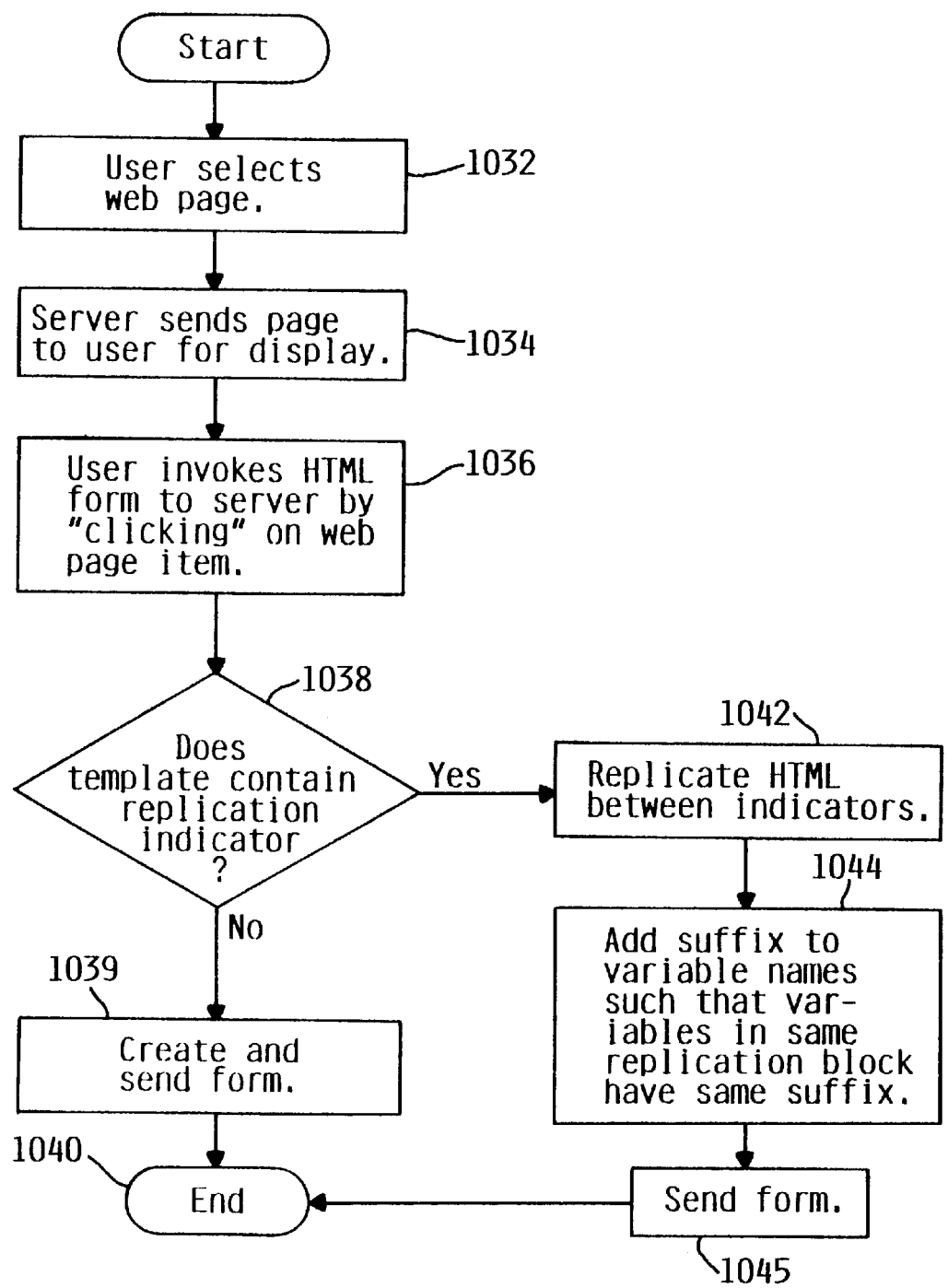
FIG. 12 is a flowchart of the process steps for determining whether an invoked HTML template includes fields to be replicated, according to the preferred embodiment.

Now referring to FIG. 12, at step 1032 a user of client computer 100 selects a web page from server computer 150 for display of the page on display device 106 that is associated with client computer 100. At step 1034, server computer 150 transmits the selected page to client computer 100 via network 145. When the selected page is displayed on display device 106, the user of client computer 100 can appropriately manipulate input device 104 to position the cursor of display device 106 over a desired item of information on which the user desires additional information, and then select the item with means well-known in the art, for example, by "clicking" a mouse button.

When the item is "clicked", an HTML form can be invoked. When a form is invoked, a CGI program on server computer 150 creates the form, using a template, and the form is sent from server computer 150 to client computer 100 such that the user can enter data into fields of the form. Accordingly, at decision step 1038 server computer 150 determines whether the template specifying the invoked HTML form to be returned to client computer 100 contains replication indicators. If it doesn't, the form is created and returned at step 1039 and, for purposes of the preferred embodiment, the process ends at step 1040. On the other hand, if an HTML template with replication indicators has been invoked, control moves to step 1042 and creates a form by (among other things) replicating the HTML that exists between replication indicators in the form being created. Then, at step 1044, suffixes are appended to variable names in the replicated blocks such that the variables in the same replication block have the same unique suffix. The form is sent in step 1045, and the process ends at step 1040.

A section of an exemplary HTML template with replication fields is:

```
<!--"NSM_SUB_RBEGIN"-->
<TR>
<TD><INPUT TYPE = "TEXT" SIZE = 15 NAME =
"NSM_SUB_5250*HOSTNAME_UNQ" VALUE =
"NSM_SUB_5250*HOSTNAME_VALUE"></TD>
<TD><INPUT TYPE = "TEXT" SIZE = 17 NAME =
"NSM_SUB_5250*TITLE_UNQ" VALUE =
"NSM_SUB_5250*TITLE_VALUE"></TD>
<TD ALIGN = CENTER><SELECT NAME =
"NSM_SUB_5250*WIDE_UNQ"
    <OPTION VALUE = DEFAULT SELECTED>Default
    <OPTION VALUE = ENABLE>27x132
    <OPTION VALUE = ENABLE> 24x80
</SELECT> </TD>
</TR>
<!--"NSM_SUB_REND"-->
```

In accordance with the preferred embodiment, "NSM_SUB_RBEGIN" is a start replication indicator, and "NSM_SUB_REND" is an end replication indicator. These indicators inform the CGI program on server computer 150 to replicate the blocks between the indicators, using the process fully disclosed below. The suffixes "UNQ" are included in the variable names as shown for purposes to be shortly disclosed.

After the replication process undertaken in steps 1042 and 1044, the single table template shown above becomes the double table form:

```
<!--"NSM_SUB_RBEGIN"-->
<TR>
<TD><INPUT TYPE = "TEXT" SIZE = 15 NAME =
  "NSM_SUB_5250*HOSTNAME_1" VALUE="rchas317"></TD>
<TD><INPUT TYPE = "TEXT" SIZE = 17 NAME =
  "NSM_SUB_5250*TITLE_1" VALUE = "rchas317,
wide screen></TD>
<TD ALIGN = CENTER><SELECT NAME =
  "NSM_SUB_5250*WIDE_1"
  <OPTION VALUE = DEFAULT> Default
  <OPTION VALUE = ENABLE SELECTED> 27x132
  <OPTION VALUE = DISABLE> 24x80
</SELECT> </TD>
</TR>
<TR>
<TD> <INPUT TYPE = "TEXT" SIZE = 15 NAME =
  "NSM_SUB_5250*HOSTNAME_2" VALUE ="rchaslkb"></TD>
<TD> <INPUT TYPE = "TEXT" SIZE = 17 NAME =
  "NSM_SUB_5250*TITLE_2" VALUE ="rchaslkb, v2r3"></TD>
<TD ALIGN = CENTER> <SELECT NAME =
  "NSM_SUB_5250*WIDE_2"
  <OPTION VALUE = DEFAULT> Default
  <OPTION VALUE = ENABLE SELECTED> 27x132
  <OPTION VALUE = DISABLE> 24x80
</SELECT> </TD>
</TR>
<!--"NSM_SUB_REND"-->
```

As shown, the suffixes "UNQ" have been replaced during parsing by numeric suffixes, with the first block value names having suffixes of "1" and the second block value names having suffixes of "2". In the event that further replications of the block are to be performed, the suffix UNQ in the third block would be replaced by the numeral "3", and so on. Also, during parsing, the value fields have been filled with data (e.g., "rchas317" in the first block and "rchaslkb" in the second), and these filled-in value fields correspond to the variable names each of which now has a unique suffix. If desired, each variable name in each replicated block can be given a unique name, with server computer 150 recording which variable names pertain to each block. In essence, the above-noted process using appended suffixes accomplishes this.

Figure 13:
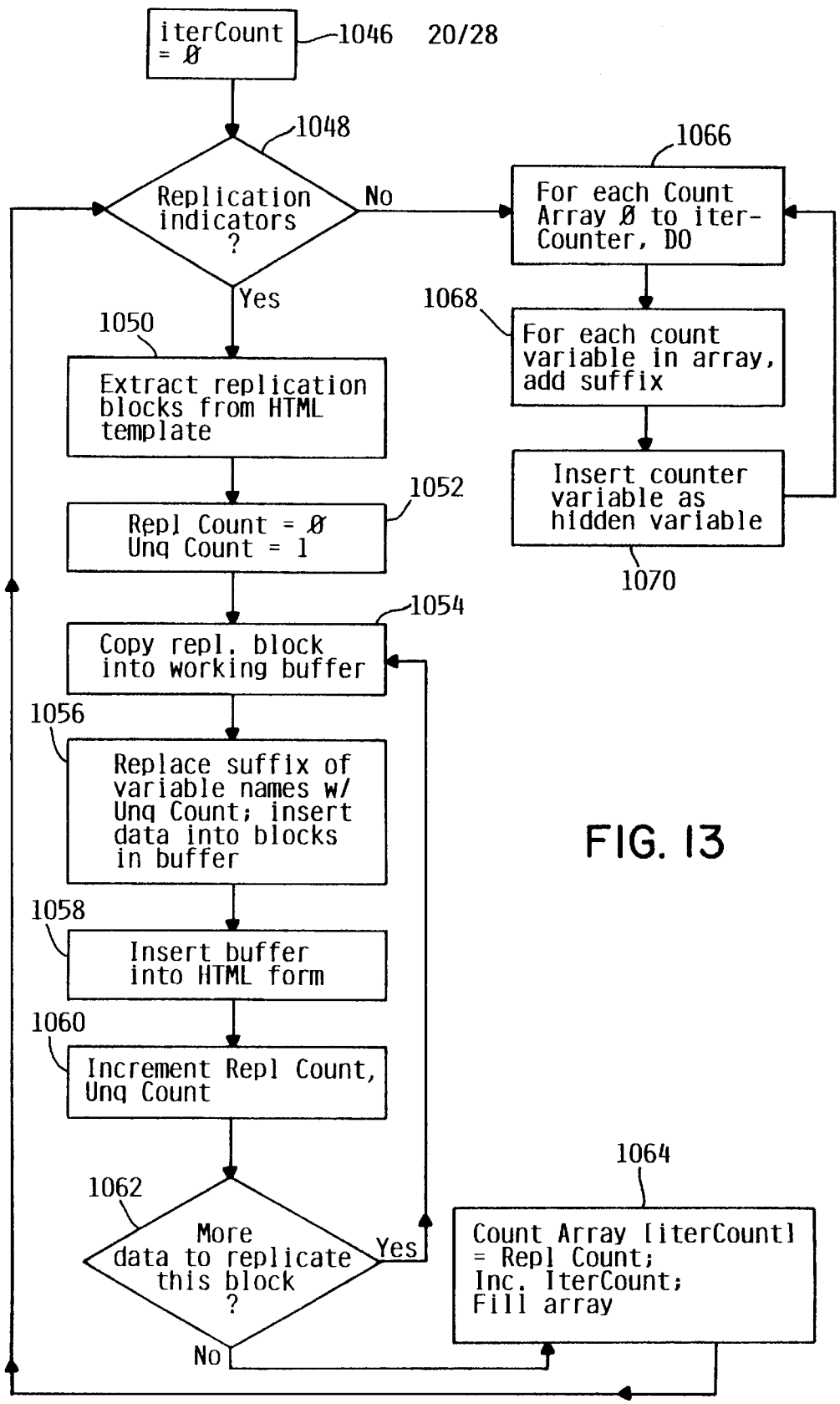
FIG. 13 is a flow chart of the server computer steps for replicating fields of an HTML template in the creation of an HTML form, according to the preferred embodiment.

The details of the replication process performed in creating an HTML form from an HTML template are shown in FIG. 13. Starting at step 1046, a counter variable "itercount" is initialized at zero. The process then moves from step 1046 to decision step 1048 to determine whether the invoked HTML form is specified by a template that includes any as-yet unprocessed replication indicators discussed above. If it does, the logic of the preferred embodiment moves to step 1050 to extract the next unprocessed replication block from the HTML template, and then at step 1052 counter variables replCount and unqcount are set equal to zero (0) and one (1), respectively.

From step 1052 the logic moves to step 1054 to copy the block to be replicated into a working buffer in server computer 150. Then, at step 1056 the suffixes "UNQ" in the block are replaced by the counter variable unqcount. Also at step 1056, data is inserted into the variable value fields as shown above.

Once the value fields have been filled with data and the field names given block-unique suffixes, the process moves to step 1058 to insert the buffer block into the HTML form being created. Moving to step 1060, the counters repiCount and unqcount are incremented by unity, and then it is determined at decision step 1062 whether the block under test contains more data that is to be replicated. If it does, the process loops back to step 1054.

If, on the other hand, the present block has been fully replicated, the process moves from decision step 1062 to step 1064. At step 1064, a Count Array value (CountArray [iterCount]) is set equal to the counter replCount. Thus, a count array has replCount=itercount elements. Also at step 1064, the block just replicated is inserted into the count array. In effect, step 1064 parses the value fields of the HTML template to fill the fields of the form with the appropriate values. From step 1064, the process loops back to decision step 1048.

Recall that decision step 1048 tests whether any further replication indicators exist in the template. If the test at decision step 1048 is negative, the process moves to step 1066 as shown to establish count variables for use in subsequent field validation by a user browser.

More particularly, at step 1066, a DO loop is entered for each count array table, i.e., for each group of fields in the count array having the same numeric suffix. The skilled artisan will recognize that the DO loop is executed for each of [(0) to itercount] count array tables. Moving to step 1068, a suffix is added to a count variable, with the suffix added being representative of the number of replications the particular block element has undergone. (This suffix is important because it is known to script functions and used to find the unique counter for the table.) Then, at step 1070 the count variable is inserted as a hidden variable for the array under test, for validation purposes to be shortly disclosed. The process then loops back to step 1066 and continues until all tables in the count array have been processed.

Figure 14:
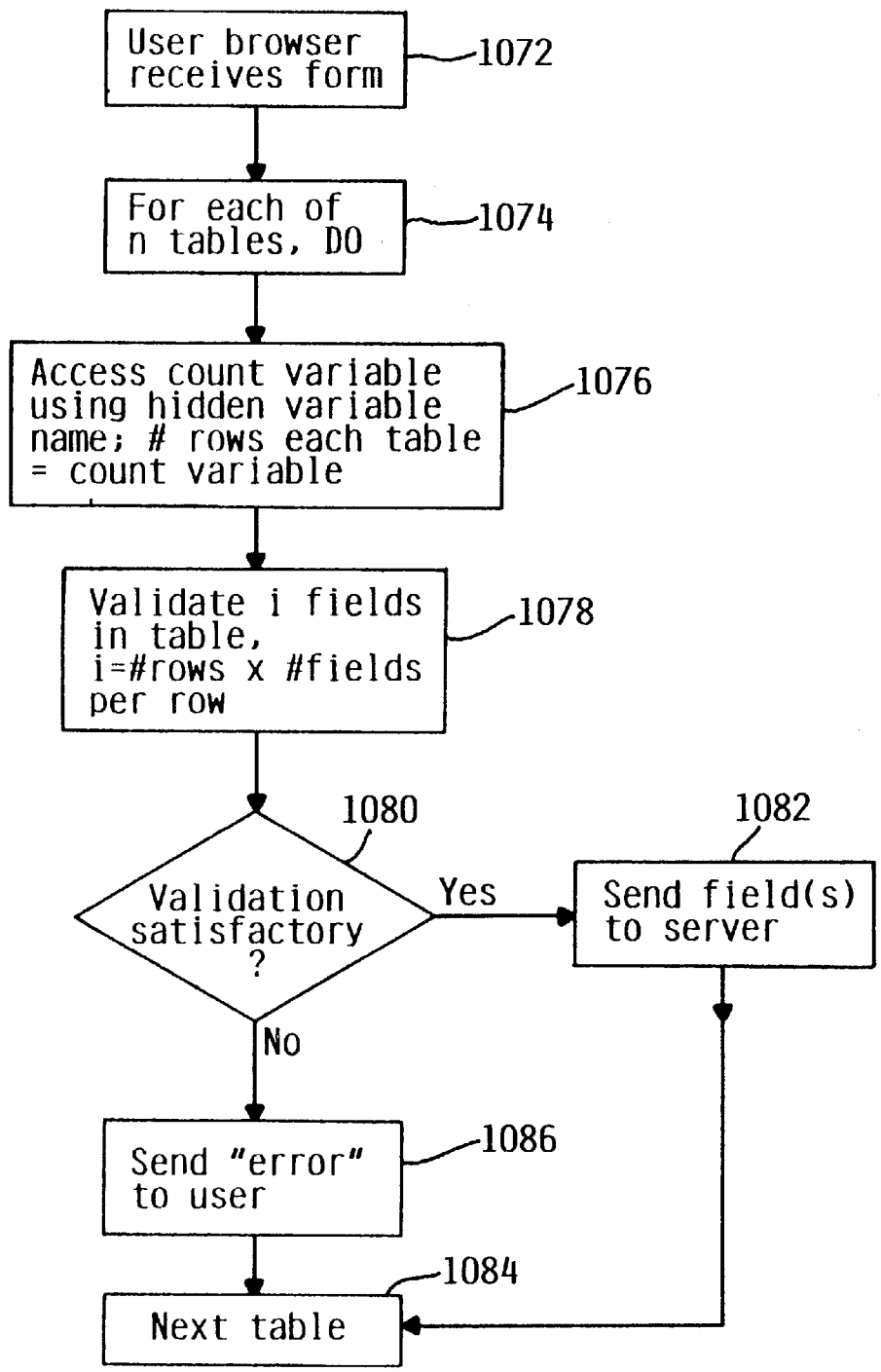
FIG. 14 is a flow chart of the browser steps for validating data entered into replicated fields of the form, according to the preferred embodiment.

The process described above in reference to FIG. 13 addresses the operation of the CGI program at server computer 150 when the user of client computer 100 has requested an HTML form specified by an HTML template with replication fields. More specifically, the process above describes the replication and field renaming process undertaken to render a full form back to client computer 100. FIG. 14, on the other hand, shows the data validation process undertaken by browser 120 of client computer 100 in response to a user inputting data into the various fields of the HTML form with replicated fields, after the form has been created as described above and then rendered to the client computer 100 via the network 145.

Commencing at step 1070, browser 120 receives the HTML form from server computer 150. At step 1074, a DO loop is entered for each of the n tables, i.e., group of blocks having the same numeric suffix, of the HTML form. Moving to step 1076, the hidden count variable, described above, is accessed using the name of the count variable, it being understood that browser 120 knows the name of the count variable a priori. (The suffix that was added by the CGI is known to the script function.) Browser 120 then calculates the number of rows in the table as being equal to the count variable.

Then, at step 1078, each of "i" fields in the table are validated, with browser 120 knowing the value of "i" by determining the product of the number of rows in the table and the number of fields per row. The number of fields per row is known by browser 120. Next, at decision step 1080, it is determined whether the validation process was satisfactory; if it was, the data entered into the fields of the HTML form are sent to server computer 150, and then the next table is retrieved for validation at step 1084. On the other hand, if a user's entry fails validation at decision step 1080, the process moves to step 1086 to send an error signal to the user of client computer 100, and then the process moves to step 1084 to retrieve the next table.

Figure 15:
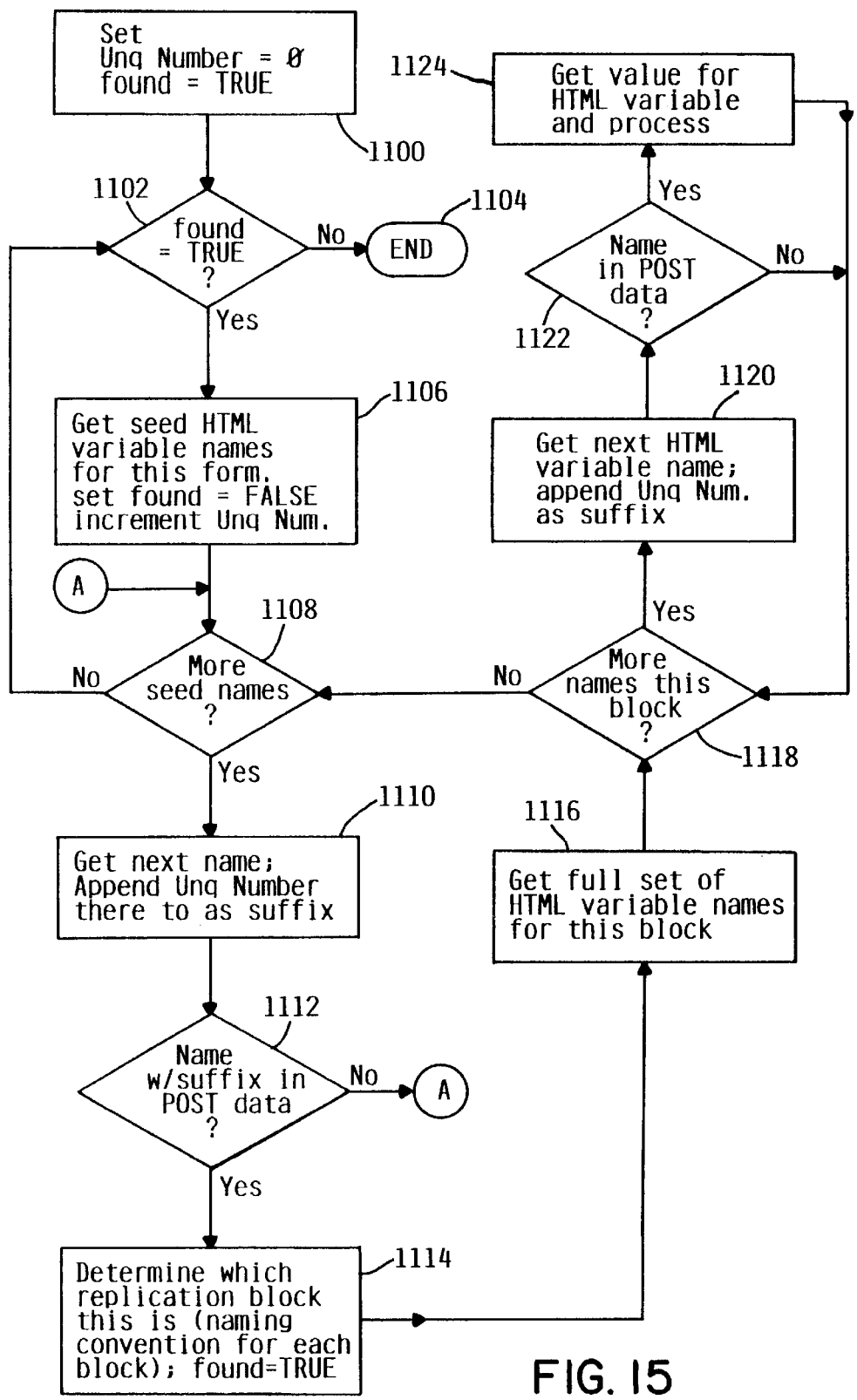
FIG. 15 is a flow chart of the steps undertaken by the server computer for processing data received in POST data from a user computer generated when an HTML form with replication blocks has been rendered, according to the preferred embodiment.

Now referring to FIG. 15, after the form with replicated blocks has been rendered to the user of client computer 100, the user can change or fill in fields in the form, and then submit the form back to server computer 150 by, e.g., appropriately manipulating input device 104. As the skilled artisan will recognize, data within the returned HTML form can be directed to, e.g., the CGI program of server computer 150 by specification in the ACTION directive on the HTML form. Upon receipt of the ACTION directive, server computer 150 invokes the CGI program, which executes the steps shown in FIG. 15 as described below. In describing the below steps, it is assumed that the data method used by present system is the so-called "POST" method, although the present invention envisions the use of methods other than POST.

Commencing at step 1100, a counter UnqNumber is initialized at zero and a flag "found" is set to have a value of TRUE. Then, at decision step 1102, the process determines whether the flag "found" is set equal to TRUE, and if not, the process ends at state 1104. Otherwise, the process moves to step 1106. Thus, for the first pass through the flow chart the process moves from decision step 1102 to step 1106.

At step 1106, a set of seed HTML variable names for the form under test is retrieved. It is to be understood that the set of seed names may be generated during the block replication processes described previously, or may be statically set. Each seed name is associated with a respective replication block in the form under test. As an example, if the present form contains a first replication block having the HTML variable name "NSM_SUB_5250*TITLE" and a second replication block having the HTML variable name "NSM_SUB_3270*TITLE", both of the above-noted variable names would appear in the set of seed names. It will be readily appreciated that the seed names in the set of seed names do not have the suffixes discussed in reference to FIG. 13 above appended thereto. Also at step 1106, the counter UnqNumber is incremented by unity (1) and the flag "found" is set to have a value of FALSE.

From step 1106, the logic proceeds to decision step 1108 to determine whether more seed names (i.e., seed names that have not yet been tested in the logic steps described below) exist in the set of seed names. When the test is negative, the process loops back to decision step 1102, but for the first pass, the test at decision step 1108 will be positive, and the logic proceeds to step 1110.

At step 1110, the next untested seed name in the set of seed names is retrieved, and the counter value of UnqNumber is appended thereto. Then, it is determined at decision step 1112 whether the name with the suffix appears in the POST data received from client computer 100. If the name with suffix does not appear in the POST data, the logic loops back to decision step 1102; if the name is present, however, the logic proceeds to step 1114.

FIG. 15 shows that at block 1114, the "found" flag is set equal to TRUE<, indicating that a seed name with suffix has been found in the POST data. Also at step 1114, it is determined, based on the seed variable name under test, which replication block is currently being processed. For example, a seed name of "NSM_SUB_5250*TITLE" indicates a block having fields associated with the numeral "5250", e.g., "NSM_SUB_5250*WIDE", "NSM_SUB_5250*HOSTNAME", and, as indicated, "NSM_SUB_5250*TITLE". On the other hand, a seed name of "NSM_SUB_3270*TITLE" indicates a block having fields associated with the numeral "3270", e.g., "NSM_SUB_3270*WIDE", "NSMSUB_3270*HOSTNAME", and, as indicated, "NSM_SUB_3270*TITLE", and so on.

After having ascertained the replication block being processed at step 1114, the logic proceeds to step 1116 to get the full set of variable names for this block. At this point, the variable names in the full set do not have the suffixes discussed in reference to FIG. 13 appended thereto. In the example discussed in relation to block 1114, the full set of names for the test block might be "NSM_SUB_5250*WIDE", "NSM_SUB_5250*HOSTNAME", and "NSM_SUB_5250*TITLE".

Moving to decision step 1118, it is determined whether any names in the set obtained at step 1116 remain to be processed by the steps discussed below. If not, the process loops backs to decision step 1108. Otherwise, the process moves to step 1120 to get the next unprocessed variable name from the set obtained at step 1116 and append the value of the counter UnqNumber thereto as a suffix. Moving to decision step 1122, it is determined whether the current name is contained in the POST data; if not, the process loops back to decision step 1118, but otherwise gets the value for the current name and processes it at step 1124 as appropriate according to the particular invoked application. After processing, the logic moves back to decision step 1118 to retrieve the next HTML variable name obtained at step 1116.

In other words, the logic between steps 1118 and 1124 continues until all HTML variable names have been processed for the current replication block. And, the logic between steps 1108 and 1124 continues until all the seed HTML variable names have been processed. Eventually, no new seed HTML variable names with a particular UnqNumber appended will be found in the POST data, at which time the logic moves back to decision step 1102 where the found flag is determined to be FALSE, thus completing the process at end state 1104.

Figure 16:
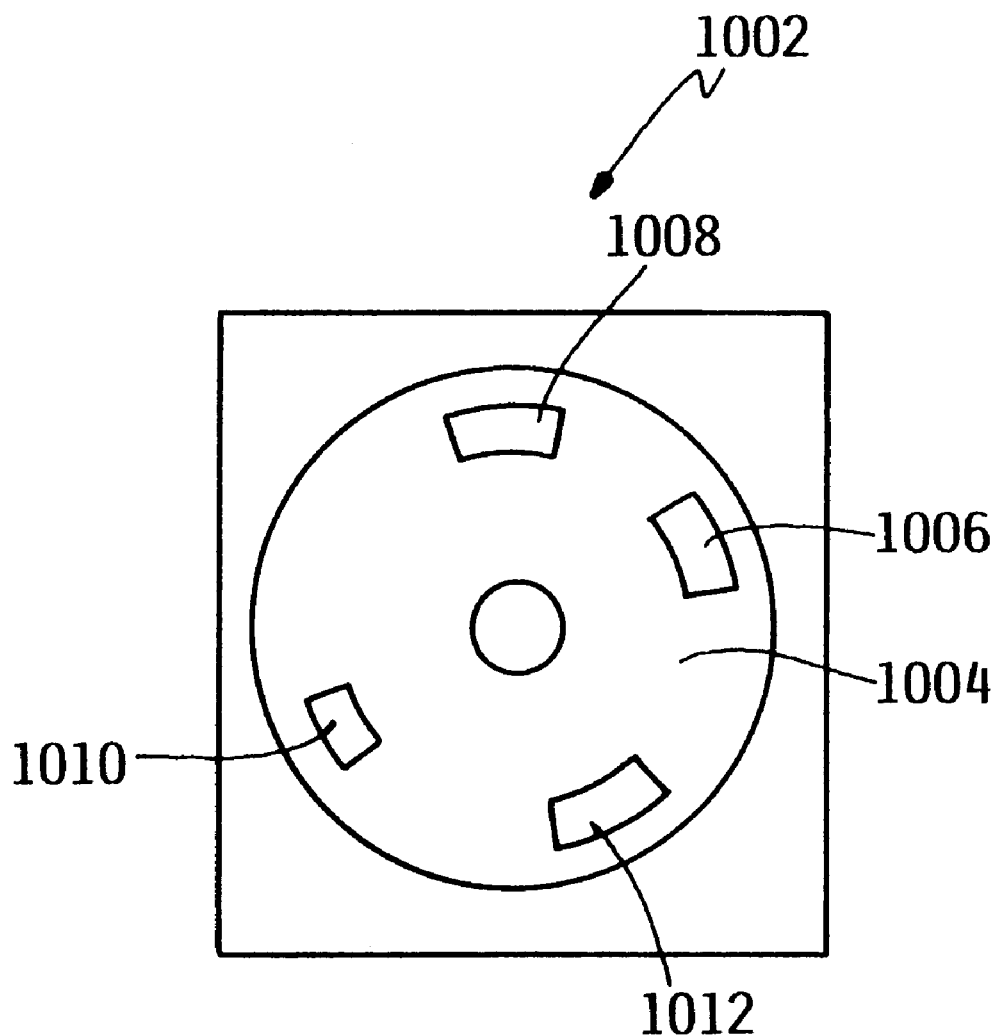
FIG. 16 is a block diagram of an article of manufacture or a computer program-product including a storage medium for storing thereon computer-executable or interpretable code for carrying out the preferred embodiment.
Figure 17:
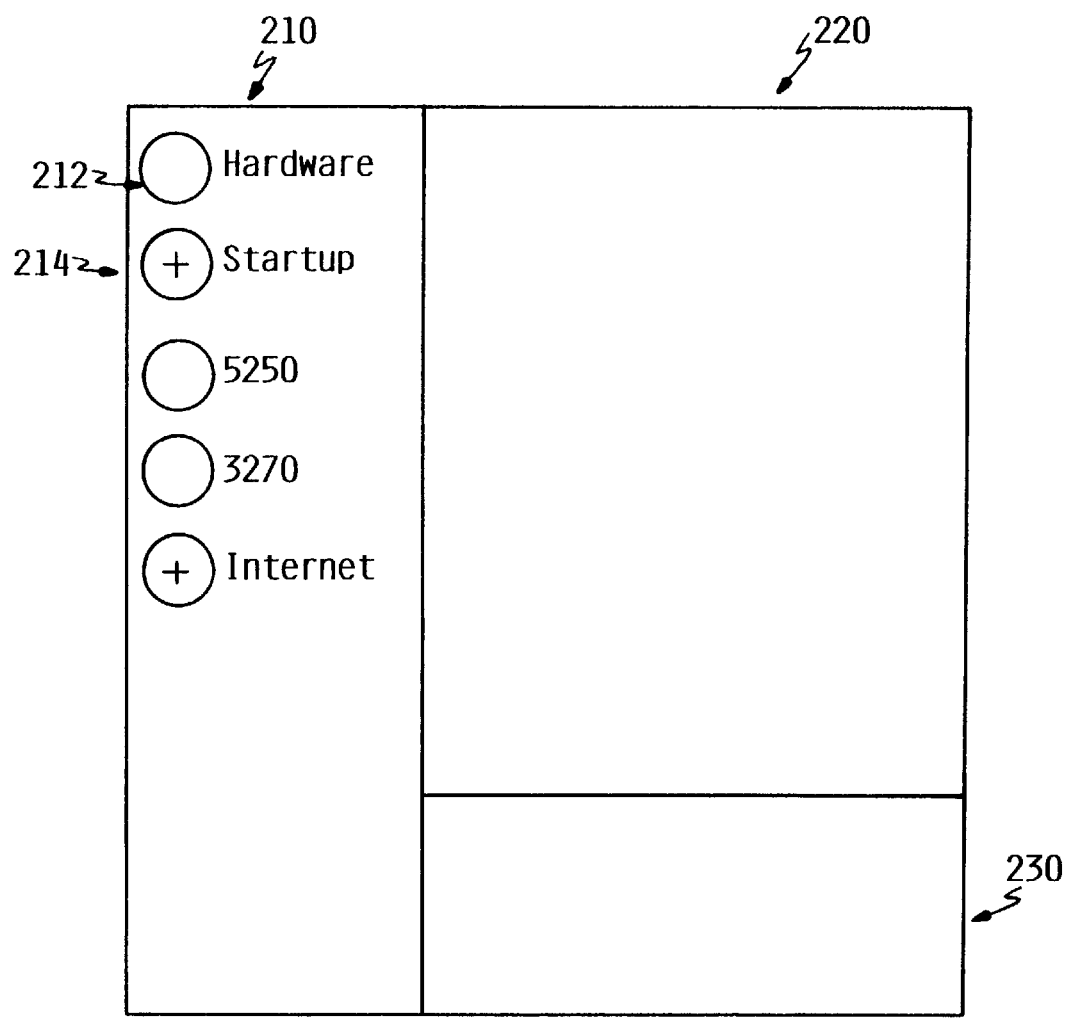
FIG. 17 is a block diagram of an example of a task-frame in browser window prior to expansion, according to the preferred embodiment.

FIG. 16 shows an article of manufacture or a computer program-product including a signal-bearing-media for storing thereon program means for carrying out the method of this invention in the system of FIG. 1. While the present invention has been described in the context of a computer system, the mechanisms of the present invention are capable of being distributed as a program-product in a variety of forms, and the present invention applies equally regardless of the particular type of signal-bearing-media used to actually carry out the distribution. Examples of signal-bearing-media include: recordable media, such as floppy disks and CD-ROMs, and transmission media such as digital and analog communications links, including wireless communications links.

An example of such an article of manufacture is illustrated in FIG. 16 as pre-recorded floppy disk 1002. Floppy disk 1002 is intended for use with a data processing system, and includes magnetic storage medium 1004, and program means 1006, 1008, 1010, and 1012 recorded thereon, for directing browser 120 to facilitate the practice of this invention. It will be understood that such apparatus and articles of manufacture also fall within the spirit and scope of this invention.

While this invention has been described with respect to the preferred and alternative embodiments, it will be understood by those skilled in the art that various changes in detail may be made therein without departing from the spirit, scope, and teaching of the invention. Although the preferred embodiment has been described with respective to buttons in forms, any type of mechanism to control the document being browsed could be used. Also, computer networks may be employed quite differently from what is known today; for example, there might be a computer network within an automobile with a server computer controlling one element, such as the fuel injection, and a client computer controlling another element, such as the operator display. Further, the type of applications that use a browser may change from what is known today. In addition, browsing technology may become widely employed in consumer applications such as operator panels for consumer electronics, appliances, and automobiles. Finally, although the preferred embodiment has been described with respect to a separate client and server computers, the client and server could exist on the same computer system. Accordingly, the herein disclosed invention is to be limited only as specified in the following claims.

What is claimed is:

1. A computer-implemented method for creating a form from a template that includes replication blocks, comprising the steps of:

replicating at least one field in at least one replication block characterized by a block name to generate at least first and second replicated fields;

modifying the block name to generate a first field name, further comprising appending a first suffix to the block name;

modifying the block name to generate a second field name, further comprising appending a second suffix to the block name, wherein the second suffix and the first suffix are different;

associating the field names with respective ones of the first and second replicated fields;

counting the number of replications;

transmitting the number of replications to at least one client computer; and validating user input, using the number of replications determined in the counting step.

2. A program-product, comprising:

a signal-bearing-media, readable by a digital processing apparatus; and code, borne on the signal-bearing-media, and including instructions executable by the digital processing apparatus to perform method steps to cause the digital processing apparatus to identify replicated fields of a template, the method steps comprising:

determining whether the template contains replication identifiers;

replicating fields between the replication identifiers;

appending a suffix to a block name associated with each field, such that a resulting name of each field is unique;

indicating the number of replications; and validating, in response to the number of replications determined in the indicating step, user inputs.

3. The program-product of claim 2, wherein the template is an HTML template.

4. A program-product, comprising:

a signal-bearing-media, readable by a digital processing apparatus; and code, borne on the signal-bearing-media, and including the instructions executable by the digital processing apparatus to cause the digital processing apparatus to create a form containing replicated fields from a template containing replication blocks by:

replicating at least one field in at least one replication block characterized by a block name to generate at least first and second replicated fields;

associating the block name with the first suffix to generate a first field name;

associating the block name with a second suffix to generate a second field name;

associating the field names with respective ones of the first and second replicated fields;

counting the number of replications;

transmitting the number of replications to at least one client computer; and validating user input, using the number of replications determined in the counting step.

5. The program-product of claim 4, wherein the form is an HTML form.

* * * * *

UNITED STATES PATENT AND TRADEMARK OFFICE
CERTIFICATE OF CORRECTION

PATENT NO. : 6,108,673
DATED : Aug. 22, 2000
INVENTOR(S) : Marcia Lynn Brandt, Joseph Vincent DiCecco, Jason Robert Hansen, Timothy Jude O'Keefe, Diane Elaine Olson and Devon Daniel Snyder It is certified that an error appears in the above-identified patent and that said Letters Patent is hereby corrected as shown below:

[54] "SYSTEM FOR CREATING A FORM FROM A TEMPLATE THAT INCLUDES REPLICATION BLOCK" should be --CREATING A FORM FROM A TEMPLATE THAT INCLUDES REPLICATION BLOCKS USING BLOCK NAME SUFFIXES--.

Signed and Sealed this

Eighth Day of May, 2001

*Attest:*

NICHOLAS P. GODICI

*Attesting Officer*      *Acting Director of the United States Patent and Trademark Office*